United States Patent

Hoshino et al.

[11] Patent Number: 5,841,657
[45] Date of Patent: Nov. 24, 1998

[54] SYSTEM DESIGNING METHOD OF A PRODUCTION LINE

[75] Inventors: Toshihiko Hoshino, Hiroshima; Shunji Sakamoto, Higashihiroshima, both of Japan

[73] Assignee: Mazda Motor Corporation, Hiroshima, Japan

[21] Appl. No.: 860,793

[22] Filed: Mar. 30, 1992

[30] Foreign Application Priority Data

Mar. 30, 1991 [JP] Japan .................................. 3-067290

[51] Int. Cl.$^6$ ............................ G06F 19/00; G05B 19/18
[52] U.S. Cl. ............................... 364/468.1; 364/140.08; 364/140.09; 364/147; 364/191; 364/468.17
[58] Field of Search .................... 364/468, 141, 364/146, 147, 578, 140.06, 140.08, 140.09, 191, 468.01, 468.09, 468.1, 468.15, 468.17

[56] References Cited

U.S. PATENT DOCUMENTS

| | | | |
|---|---|---|---|
| 4,445,169 | 4/1984 | Wakia et al. | 364/147 |
| 4,663,704 | 5/1987 | Jones et al. | 364/188 |
| 4,703,414 | 10/1987 | Inoue et al. | 364/147 |
| 4,841,431 | 6/1989 | Takagi et al. | 364/474.11 |
| 4,852,047 | 7/1989 | Lavallee et al. | 364/191 |
| 4,926,308 | 5/1990 | Giles et al. | 364/147 |
| 4,991,076 | 2/1991 | Zifferer et al. | 364/147 |
| 5,177,420 | 1/1993 | Wada et al. | 318/568.11 |

FOREIGN PATENT DOCUMENTS

| | | |
|---|---|---|
| 0200441 | 5/1986 | European Pat. Off. . |
| 0444655 | 9/1991 | European Pat. Off. ........ G05B 19/05 |

OTHER PUBLICATIONS

U.S. patent application No. 07/590,079, Sakamoto et al., filed Sept. 28, 1990.
U.S. patent application No. 07/629,964, Sakamoto et al., filed Dec. 21, 1990.
U.S. patent application No. 07/690,057, Sakamoto et al., filed Apr. 23, 1991.

Primary Examiner—Paul P. Gordon

[57] ABSTRACT

The designing method for managing a plurality of units in a production line in the accordance with the present invention comprises the steps of: producing data base including a plurality of name data and operation data for each of a plurality of actuator devices included in the units, each name data enabling a user to identify the actuator device and each operation data expressing the operation of the respective actuator device; dividing the system into a plurality of subsystems, each of which functions to realize a part of the management of the plurality of units; and attaining the operation data of an objective actuator device by searching the data base with each name data as a key; whereby realizing the function of each subsystem.

19 Claims, 31 Drawing Sheets

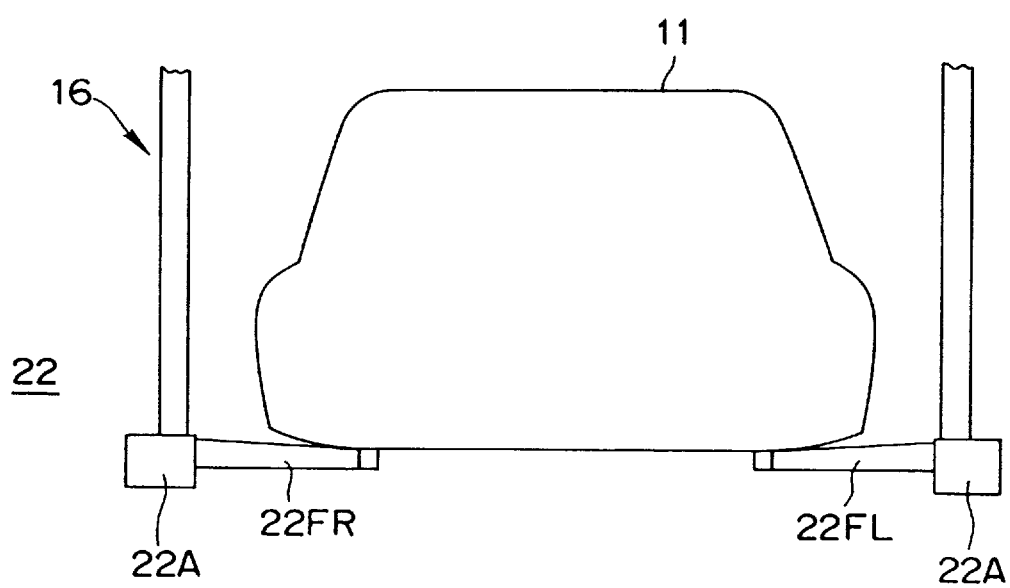
F I G. 3

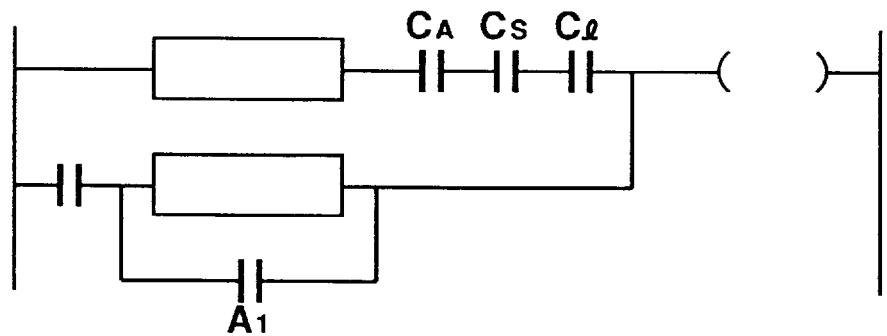
F I G. 8B
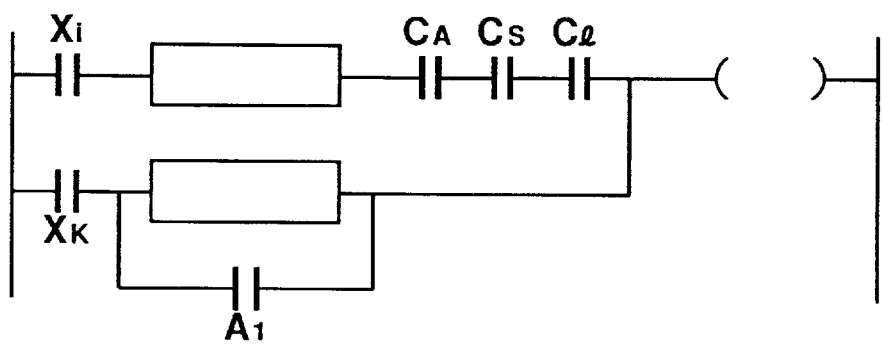
F I G. 8C

| BLOCK No. | BLOCK NAME | FROM | TO | STEP FLOW MAP POINTER | DEVICE TYPE | OPERATION PERIOD $\tau_{Bi}$ |
|---|---|---|---|---|---|---|
| B0 | STAND WITHDRAW | B7 | B1 | | | |
| B1 | POSITIONING DETECTION | B0 | B2 | | | |
| B2 | STAND ADVANCING | B1 | B4,B5 | | | |
| B3 | TRANSFER DEVICE WITHDRAW | B10 | END | | | |
| B4 | REF. PIN ACTUATED | B2 | B6 | | | |
| B5 | RECEIVING STAND ACTUATED | B2 | B6 | | | |
| B6 | TRANSFER DEVICE UPLIFTING | B4,B5 | B7,B8 | | | |
| B7 | REF.PIN RETURNED | B6 | B0 | | | |
| B8 | TRANSFER DEVICE ADVANCING | B6 | B9 | | | |
| B9 | TRANSFER DEVICE LOWERED | B8,B11,B14 | B10,B12,B15 | | | |
| B10 | TRANSFER DEVICE UPLIFTED | B9 | B3 | | | |

FIG. 11

| BLOCK No. | STEP No. | STEP NAME | OPERATION | FROM | TO | OUTPUT B | CONFIR-MATION A | MANUAL C | OPERATION PERIOD $\tau_{si}$ |
|---|---|---|---|---|---|---|---|---|---|
| B4 | 1 | RR SLIDE ACT. | ACTUATED | | 2,3 | | | | |
| | 2 | FL REF. PIN A | ACTUATED | 1 | 4 | | | | |
| | 3 | FL REF. PIN B | ACTUATED | 1 | 4 | | | | |
| | 4 | RR REF. PIN ACT. | ACTUATED | 2,3 | 5 | | | | |
| | 5 | TL POSIT. RETURN | RETURNED | 4 | 6 | | | | |
| | 6 | BR POSIT. DEVICE RETURN | RETURNED | 5 | 7 | | | | |
| | 7 | BF POSIT. DEVICE RETURN | RETURNED | 6 | END | | | | |

F I G. 12

| | NAME | OPERATION | OUTPUT B | CONFIR-MATION A | MANUAL C | OPERATION PERIOD $T_0$ |
|---|---|---|---|---|---|---|
| RECEIVING STAND | BF POSIT. DEVICE | ACT. | B A0 | A C0 | C 2000 | |
| | BF POSIT. DEVICE | RETURN | B A1 | A C1 | C 2001 | |
| | BR POSIT. DEVICE | ACT. | B A2 | A C2 | C 2002 | |
| | BR POSIT. DEVICE | RETURN | B A3 | A C3 | C 2003 | |
| | TL POSIT. DEVICE | ACT. | B A4 | A C4 | C 2004 | |
| | TL POSIT. DEVICE | RETURN | B A5 | A C5 | C 2005 | |
| TRANSFER DEVICE POSITIONING | RR SLIDE | ACT. | B A6 | A C6 | C 2006 | |
| | RR SLIDE | RETURN | B A7 | A C7 | C 2007 | |
| | RR REF. PIN | ACT. | B A8 | A C8 | C 2008 | |
| | RR REF. PIN | RETURN | B A9 | A C9 | C 2009 | |
| | FL REF. PIN A | ACT. | B AA | A CA | C 2010 | |
| | FL REF. PIN A | RETURN | B AB | A CB | C 2011 | |
| | FL REF. PIN B | ACT. | B AC | A CC | C 2012 | |
| | FL REF. PIN B | RETURN | B AD | A CD | C 2013 | |
| | GUIDE | UPLIFTED | B AE | A CE | C 2014 | |
| | GUIDE | LOWERED | B AF | A CF | C 2015 | |
| TRANSFER LIFTER | TL BRAKE | OPEN | B B0 | A D0 | C 2016 | |
| | TL BRAKE | CLOSE | B B1 | A D1 | C 2017 | |
| | FR R-STAND | ACT. | B B2 | A D2 | C 2018 | |
| | FR R-STAND | RETURN | B B3 | A D3 | C 2019 | |
| | FL R-STAND | ACT. | B B4 | A D4 | C 2020 | |
| | FL R-STAND | RETURN | B B5 | A D5 | C 2021 | |
| | RR R-STAND | ACT. | B B6 | A D6 | C 2022 | |
| | RR R-STAND | RETURN | B B7 | A D7 | C 2023 | |
| | RL R-STAND | ACT. | B B8 | A D8 | C 2024 | |
| | RL R-STAND | RETURN | B B9 | A D9 | C 2025 | |
| → | RECEIVING STAND | ADVANCING | B BA | A DA | C 2026 | |
| | RECEIVING STAND | WITHDRAWING | B BB | A DB | C 2027 | |
| LIFTER | LIFTER | UPLIFTED | B BC | A DC | C 2028 | |
| | LIFTER | LOWERED | B BD | A DD | C 2029 | |
| | LIFTER | ADVANCING | B BE | A DE | C 2030 | |
| | LIFTER | WITHDRAWING | B BF | A DF | C 2031 | |

FIG. 13

| | |
|---|---|
| DEVICE NAME | BF POSITIONING |
| | TL SLIDE |
| | RR SLIDE |
| | ⋮ |
| OPERATION NAME | ACTUATED |
| | RETURNED |
| | STARTED |
| | UPLIFTED |
| | LOWERED |

F I G. 15B

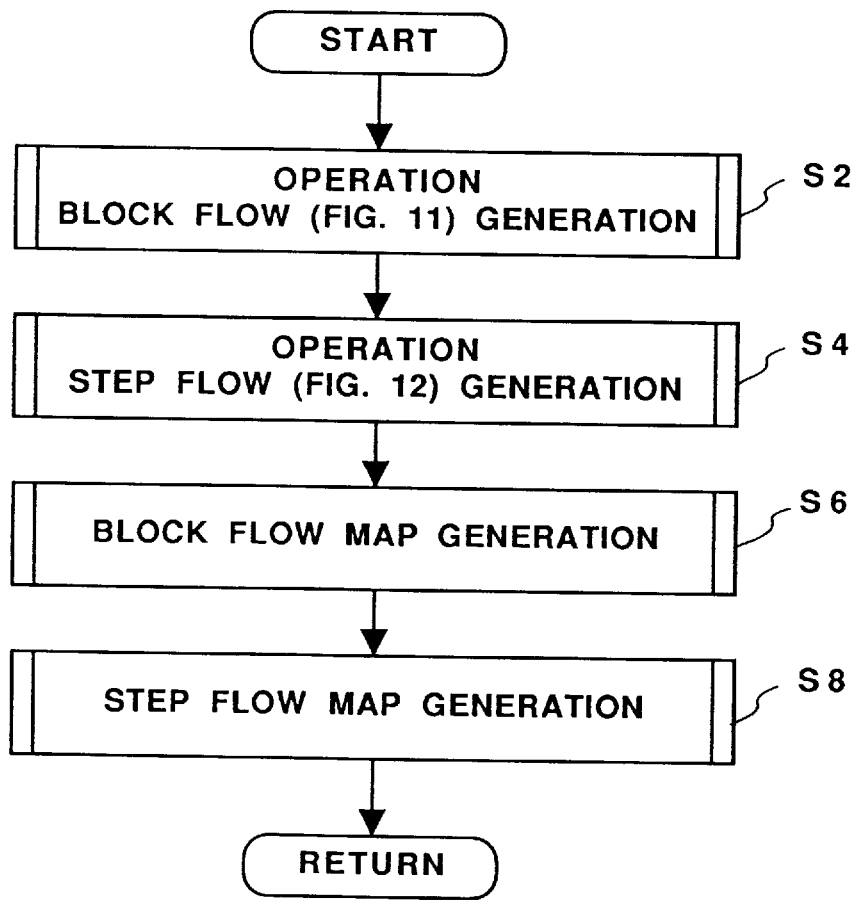
F I G. 16

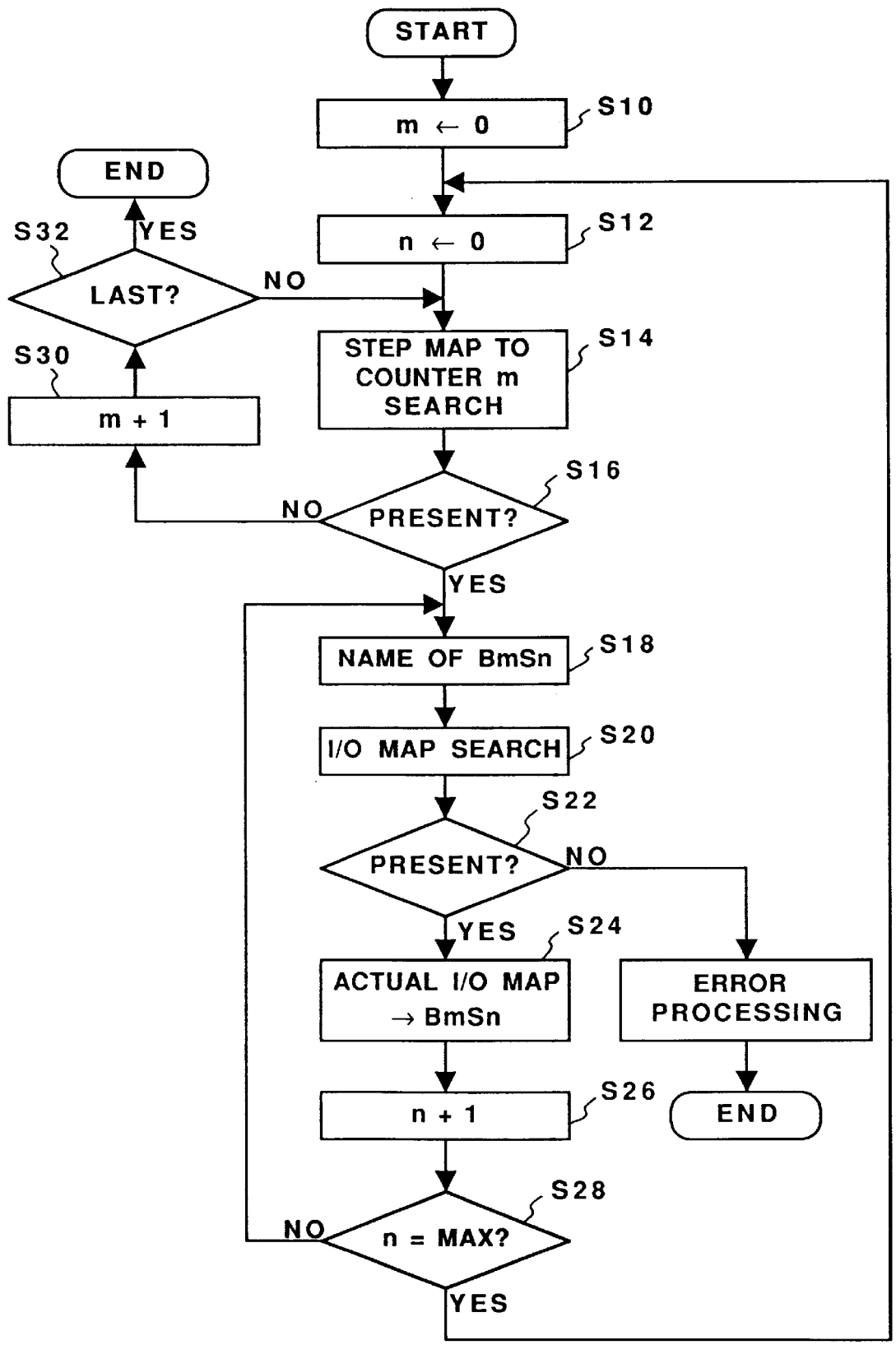
F I G. 17

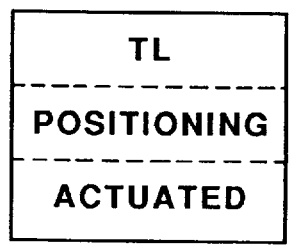
F I G. 22
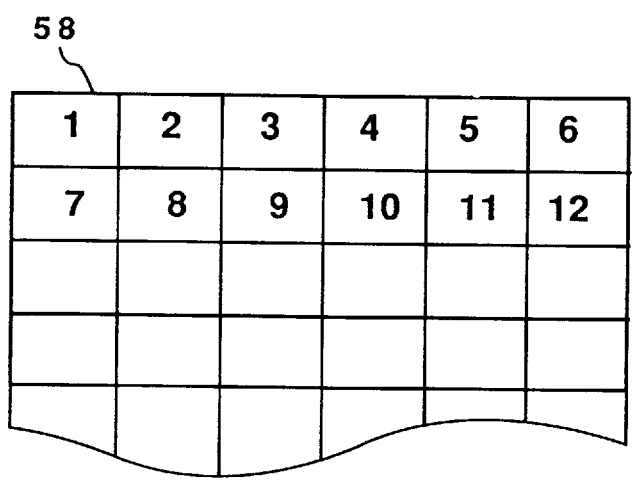
F I G. 23
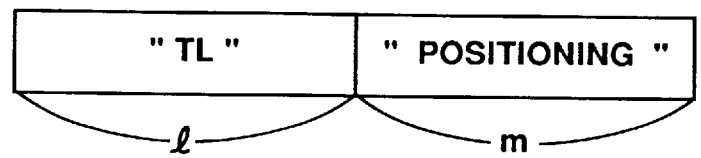
F I G. 24

| DISPLAY POSITION | COLOR | | S/L | M/A |
|---|---|---|---|---|
| 1 | BLUE | RED | S | A |
| 2 | BLUE | RED | S | A |
| 3 | BLUE | RED | S | A |
| 4 | | | | |
| 5 | | | | |
| 6 | | | | |
F I G. 25
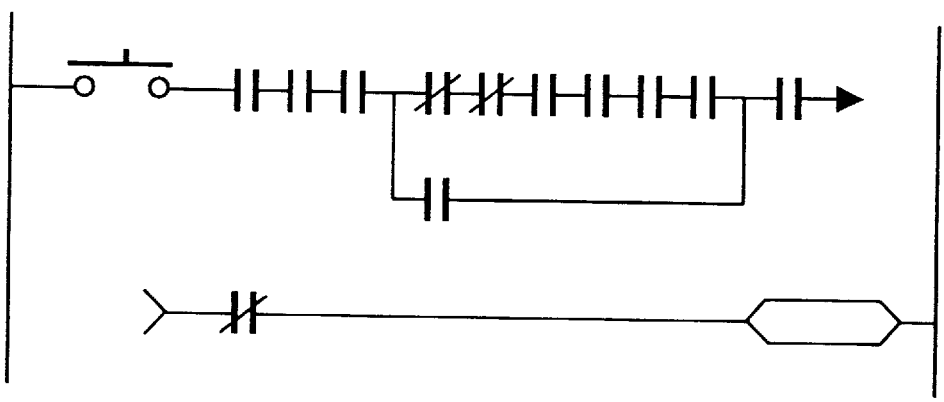
F I G. 26

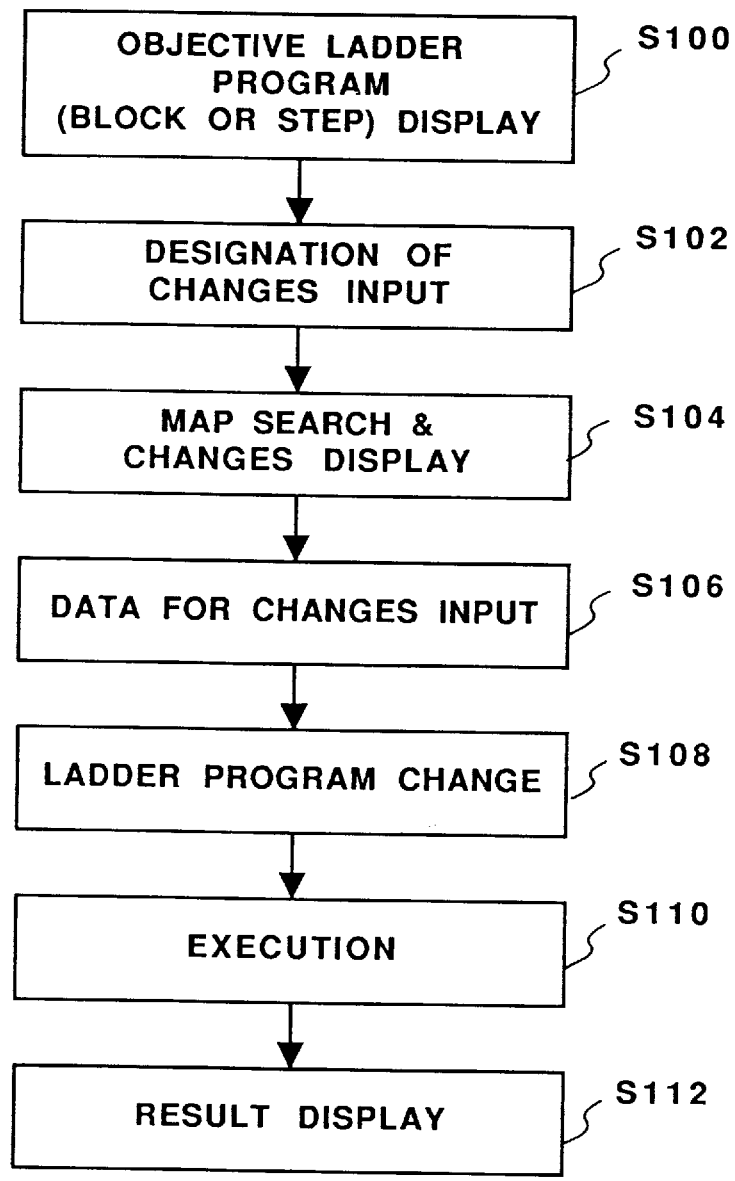
F I G. 30

SYSTEM DESIGNING METHOD OF A PRODUCTION LINE

BACKGROUND OF THE INVENTION

1. Field of the Invention

This invention relates to a system designing method of production units which are controlled by a sequencer, more particularly, to reduce steps for designing the system and to simplify the system maintenance.

2. Description of the Related Art

A known system for controlling a production line, e.g. a motor vehicle assembly line, includes a sequential control unit incorporating a computer to effect sequential control of various equipment units provided for the production line with respect to operations which are to be successively affected by the equipment. To perform sequential control, the computer incorporated in the sequential control unit is provided with a sequential control program, and successively controls the operations of equipment units provided along the production line in accordance with the sequential control program.

The inventors of the present application have already proposed in the Japanese Patent Application No. Hei 1-335271, 2-110979, 2-30379, 1-253991 (which correspond to the U.S. Pat. applications under Nos. 07/590,079, 07/629,964, and 07/690,057), a control method for a sequential control system.

According to the production line management method proposed by the above listed applications, the general control conditions of the all units in the production line controlled by the sequencers are described in an "input/output map", while sequence actions in the line are understood as a series of "operation blocks" and "operation steps". Furthermore, "ladder programs" are produced based on the "input/output map", the "operation step flow map", and the "operation block flow map".

In fault diagnosis, according to the above listed applications, an operational state of the composing elements in a sequential controller is normally operated, is previously set as a standard operational state. This standard state is compared with an operational state of the composing elements in the sequential controller at any time under the actual operation. The fault diagnosis is performed based upon the difference between those states and the procedure is consecutively operated for fault diagnosis.

According to the above-mentioned inventions, complicated control programs for a production line could be easily produced by the input/output map, the block flow map, and the step flow map. However, there is the drawback such that the input/output map, the block flow map, and the step flow map must be inputted manually and it is a major obstacle for efficiency improvement in program development.

SUMMARY OF THE INVENTION

An object of the present invention is to provide a system designing method of production units which improves efficiency in the program development and simplifies program maintenance.

Another object of the present invention is to provide a system designing method for managing a plurality of units placed in a production line. The designing method according to the present invention comprises the steps of:

producing data base including a plurality of name data and operation data for each of a plurality of actuator devices included in the production equipment units, each name data enabling a user to identify the actuator device and each operation data expressing the operation of the respective actuator device;

dividing the system into a plurality of subsystems, each of which functions to realize a part of the management of the plurality of production equipment units; and attaining the operation data of an objective actuator device by searching the data base with each name data as a key;

whereby realizing the function of each subsystem.

Only one data base, which includes an enormous amount of data to manage the production line, needs be developed since the data base is shared among the subsystems. This data base can be accessed by using a name, which is predetermined as a key for each device. Therefore, the system is friendly to system developers and system users and has high efficiency both in system development and system maintenance.

According to an aspect of the present invention, each name data is either the name of an actuator device or the name of the operation by the actuator device.

According to another aspect of the present invention, in the case where a modification is made in any one of the subsystems, name data of an actuator which is associated with the modification is also changed to correspond to the new function.

According to further aspect of the present invention, in the case where the overall system management is changed, functions, name data, and operation data which are concerned with the change within the data base are corrected. Furthermore, in the case where a function is changed in the subsystems, name data of the actuator is also changed to correspond to the new function.

Another object of the present invention is to provide a method for generating symbols of sequential ladder programs which control the production line including a plurality of actuator devices comprising the steps of:

registering each actuator device in a library, which can be accessed by a user; and selecting one of the names in the library as a sequential program ladder element.

That is, in the case where the library is used and sequential programs are generated, a device which is necessary as a program ladder element can be specified by the name of the device which is familiar to users and programmers.

According to an aspect of the present invention, each name data is either the name of an actuator device or the name of the operations of the actuator device.

According to another aspect of the present invention, the present method further comprises the steps of:

generating an actuator device map which includes the operation data of each actuator device as well as the name data of the actuator device;

generating a flow map which includes the data of the sequential operations of the actuator devices in the production line as well as the names;

generating a sequence control program for the production line by linking each sequential operation included in the flow map and the operation of an actuator device included in the actuator device map by using the name of an actuator device included in each sequential operations as a key, according to the order of the sequential operations in the flow map.

According to further aspect of the present invention, the present method further comprises the steps of:

preparing standard ladder patterns in advance, each of which includes an interlock condition symbol representing a logic step in which the actuator device is activated, and an output symbol; and assigning the data in the actuator device map corresponding to an actuator device in the flow map to the interlock condition and the output of the actuator device in the flow map.

Another object of the present invention is to provide a method for generating sequential programs for production units comprising the steps of:

generating an actuator device map which includes the operation data of a plurality of actuator devices of the production units as well as the name data of the respective actuator devices;

generating a flow map including the order data of the sequential operations of the actuator devices as well as the names of the sequential operations;

generating a sequence control program for the production units by linking each sequential operation included in the flow map and the operation of an actuator device included in the actuator device map by using the name of an actuator device included in each sequential operations as a key, according to the order of the sequential operations in the flow map.

That is, in the case where a sequential program is generated, program development is enabled in a manner such that each program is understood as the device name which is familiar to operators and it enables high efficiency in program development and system maintenance.

According to an aspect of the present invention, the present method further comprises the steps of:

preparing standard ladder patterns in advance, each of which includes an interlock condition symbol, representing a logic step in which the actuator device is activated, and an output symbol; and assigning the data in the actuator device map corresponding to an actuator device in the flow map to the interlock condition and the output of the actuator device in the flow map.

According to an aspect of the present invention, the ladder patterns are registered as library based on the type of the operation in the production equipment units.

Other objects and advantages besides those discussed above shall be apparent to those skilled in the art from the description of a preferred embodiment of the invention which follows. In the description, reference is made to the accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 1, 2, and 3 are diagrams of the motor vehicle assembling line to which the present invention is applied;

FIGS. 7B, 7C, 8A, 8B and 8C are diagrams of standard ladder element patterns according to the present embodiment;

FIG. 11 is a diagram which is referred to as a block flow map according to the present embodiment;

FIG. 12 is a diagram which is referred to as a step flow map of the block 4 according to the present embodiment;

FIG. 13 is a diagram which is referred to as an I/O map in the system according to the present embodiment;

FIG. 15B is a diagram which represents a library structure of the device names and the operation names;

FIG. 16 is a flowchart of the operation procedure in the data-inputting program;

FIGS. 17 and 18 are flowcharts which show the procedures in the ladder program compiler;

FIG. 22 is an example of the display in the CRT;

FIG. 23 is a diagram of the display screen which is divided into cells;

FIG. 24 is a diagram which shows the structure of the field of the device name.

FIG. 25 is a diagram of the structure of the data inputted by the user to control the display in the CRT;

FIG. 26 is a diagram of the ladder pattern for the consecutive carrying operations;

FIGS. 29 and 30 are flowcharts which show the control procedures in the simulation program.

DESCRIPTION OF THE PREFERRED EMBODIMENT

Figure 1:
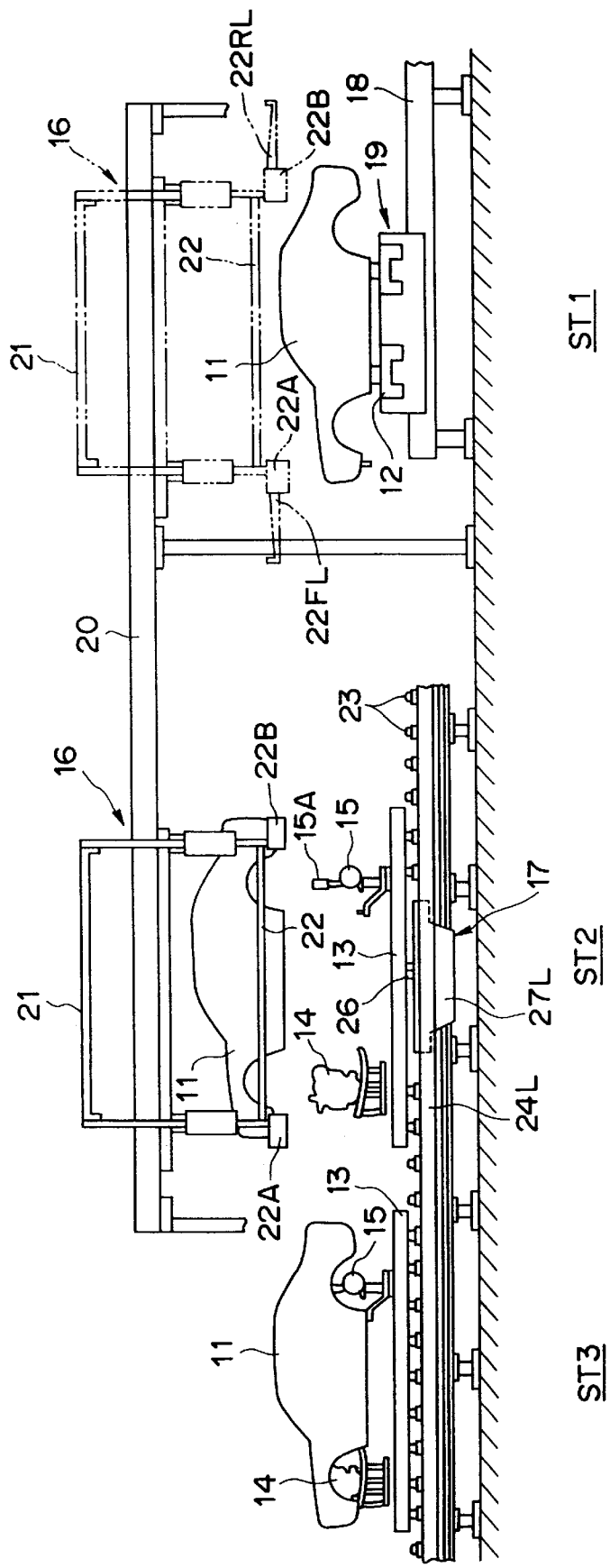

An embodiment of the present invention in which the invention is applied to sequential control of a motor vehicle production line will be described below with reference to the accompanying drawings.

<CHARACTERISTICS OF THE SYSTEM>

The characteristics of the system according to the present embodiment are as follows:

i: All operations in the production equipment units (referred to as "units" below) to be managed in the production line are grouped into blocks and each operation block is further grouped into a plurality of operation steps.

ii: Each operation block and operation step has a unique "name" so that programmers or operators (referred to as "users" below) can easily recall the corresponding operation block or operation step.

iii: The present system has functions such as automatic formation of the ladder programs, simulation of the formed ladder programs, system management during actual operation or simulation, and fault diagnosis. In processes where these functions are transformed to the programs, a user interface between the system and the operator and a program interface between the programs are administrated with the "name". In other words, the user interface and the program interface reduce steps required for development of the sequential control programs and the system maintenance. More particular characteristics of the system described in the characteristic iii are as follows:

iii-1: According to the present system, all the possible variables in all the possible program combinations, which can run on the present system, e.g. devices in all the units in the system, steps where these device are used, and operation blocks comprising these steps, are named, and these names are registered in a library. Since the registered names are used in the process of producing the programs (sequential ladder programs in particular), which run with the present system, it enables efficient program development.

iii-2: According to the present system, all programs which relate to the production units such as sequential control programs, simulation programs, fault diagnosis programs, and display control programs of the CRT console panel in particular can access the common data base. (The part of the data is referred to as an "actual I/O map"). This data base includes generalized information which relates to all the devices in the production line and is necessary to control the devices, e.g. the names of signals which activate the devices and the names of signals which confirm activated states of the devices. Therefore, in the process of the formation of the above-mentioned sequential control programs, simulation programs, fault diagnosis programs, and display control programs of the CRT operational panel, the information which is necessary for devices or operations can be referred in a manner such that the operator or user simply uses the name of the device or the name of the operation in the program.

The system of this embodiment is applied to automatically forming a sequential control program when an engine and suspensions are placed in a vehicle body in a vehicle assembling line. The vehicle assembling line which is the control object of the sequential program will be described first. The section for operation blocks and operation steps will next be described which are concepts important to this embodiment. The section automatically forming the control programs relating to the features of this embodiment will thereafter be described.

<EXAMPLE OF ASSEMBLING LINE>

An example of a vehicle assembly line to be controlled by the sequential control program in accordance with the embodiment will be described below with reference to FIGS. 1 and 2.

Figure 2:
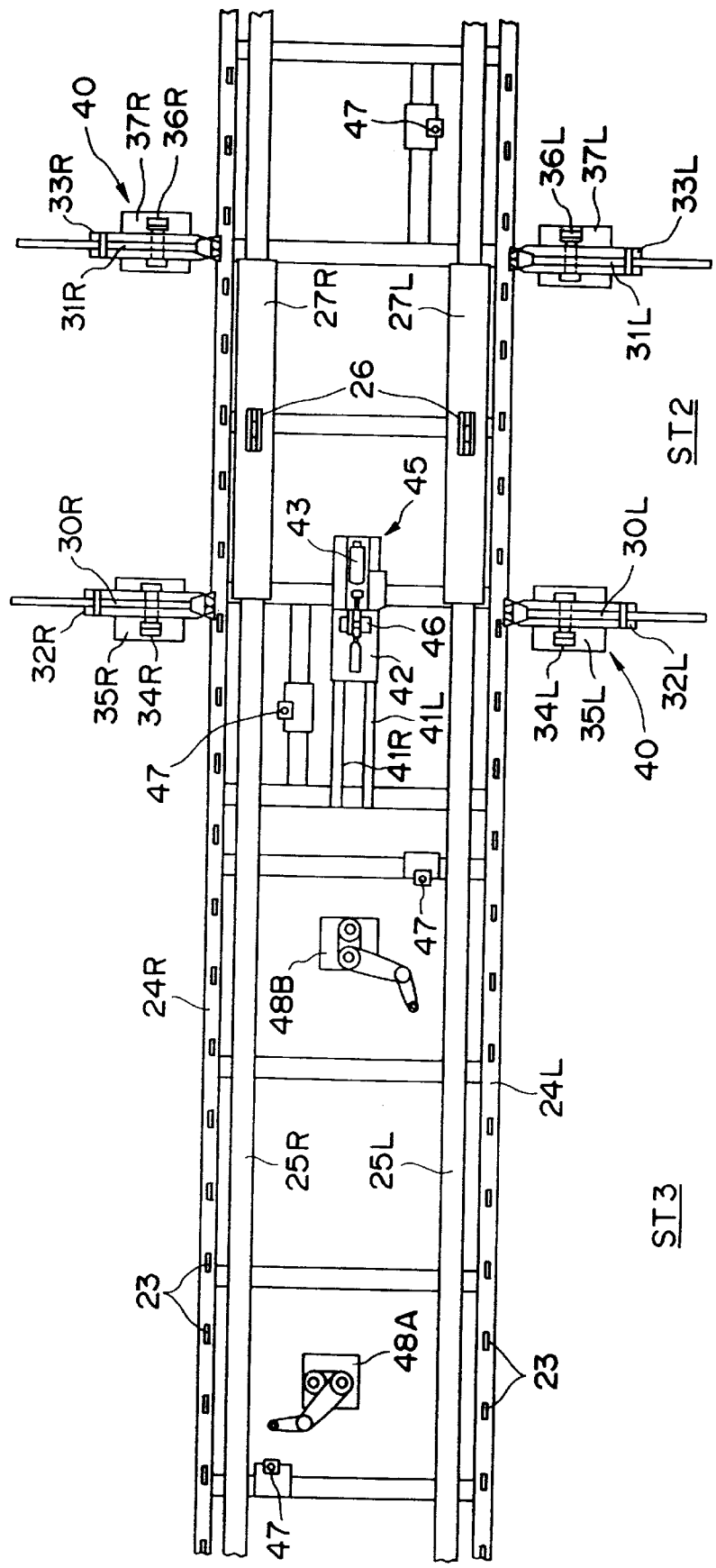

A part of the vehicle assembly line shown in FIGS. 1 and 2. This assembly line consists of, for example, three stations: a positioning station ST1, a docking station ST2, and a screwing station ST3. At the positioning station ST1, a body 11 of a vehicle is placed on a receiving stand 12 and is positioned thereon by the positioning control of the receiving stand 12. At the docking station ST2, an engine 14, a front suspension assembly (not shown) and a rear suspension assembly 15 placed in predetermined positions on a pallet 13 are set in combination with the body 11. At the screwing station ST3, the engine 14, the front suspension assembly and the rear suspension assembly 15 set at the station ST2 are fixed to the body 11 with screws. An overhead type transfer device 16 for holding and transporting the body 11 is provided between the positioning station ST1 and the docking station ST2. A pallet carrying device 17 for transporting the pallet 13 is provided between the docking station ST2 and the screwing station ST3.

The receiving stand 12 in the positioning station ST1 is reciprocatively moved along a rail 18. The positioning station ST1 is provided with a positioning means (denoted as BF) for positioning the body 11 placed on the receiving stand 12 with respect to a front portion of the body 11 in the widthwise direction of the vehicle by moving the receiving stand 12 in a direction perpendicular to the rail 18 (in the widthwise direction of the vehicle), another positioning means (BR) for positioning a rear portion of the body 11 in the widthwise direction of the vehicle, and a further positioning means (TL) for positioning the body 11 in the direction of the front or rear of the body 11 by moving the receiving stand along the rail 18 (in the direction of the front or rear end of the body 11). At the station ST1, there are further provided lifting reference pins (FL, FR, RL, and RR) which are used to position the body 11 relative to the receiving stand 12 by being brought into engagement with left and right front portions and left and right rear portions of the body 11. These positioning means and the lifting reference pins constitute a positioning unit 19 in the positioning station ST1. That is, the positioning means and the lifting reference pins are objects of control based on the sequential control program with respect to the positioning unit 19.

The transfer device 16 has a guide rail 20 extending over the positioning station ST1 and the docking station ST2, and a carrier 21 capable of moving along the guide rail 20. A lifting hanger frame 22 is attached to the carrier 21, and the body 11 is supported by the lifting hanger frame 22. As shown in FIGS. 1 and 3, a left fore support arm 22 FL and a right fore support arm 22 FR are attached to the lifting hanger frame 22 through a pair of fore arm clamps 22A, and a left rear support arm 22RL and a right rear support arm 22RR (not shown) are also attached to the lifting hanger frame 22 through a pair of rear arm clamps 22B.

Both of the fore support arms 22FL and 22FR are rotated on the corresponding fore arm clamp 22A and are positioned such as to extend along the guide rail 20 when released from the state of being clamped by the fore arm clamp 22A, or are positioned such as to extend in a direction perpendicular to the guide rail 20 when clamped by the fore arm clamp 22A, as shown in FIG. 3. Similarly, both of the left rear support arm 22RL and the right rear support arm 22RR are rotated on the corresponding rear arm clamp 22B and is positioned such as to extend along the guide rail 20 when released from the state of being clamped by the rear arm clamp 22B, or are positioned such as to extend in a direction perpendicular to the guide rail 20 when clamped by the rear arm clamp 22B.

To load the transfer device 16 with the body 11, the transfer device 16 is moved to a position (starting position) indicated by a dot-dash line shown in FIG. 1, at which its front end is located right above the front end of the rail 18, and the fore support arms 22FL and 22FR are released from the state of being clamped by the clamps 22A to extend along the guide rail 20. The lifting hanger frame 22 is thereafter moved downward. In this state, the receiving stand 12, on which the body 11 is placed, is moved along the rail 18. The front end of the rail 18 to be set in a position corresponding to that of the lifting hanger frame 22 of the transfer device 16, which has been moved downward. The left fore support arm 22FL and the right fore support arm 22FR are respectively rotated to the position extending in the direction perpendicular to the guide rail 20 below the front portion of the body 11, and are clamped by the front arm clamps 22A. Also, the rear support arms 22RR and 22RL are respectively rotated into position extending in the direction perpendicular to the guide rail 20 below the rear portion of the body 11, and are clamped by the rear arm clamps 22B. Thereafter, the lifting hanger frame 22 is moved upward and the body 11 is supported by the fore support arms 22FL and 22FR, the rear support arms 22RL and 22RR attached to the lifting hanger frame 22 of the transfer device 16, as shown in FIG. 3.

The pallet carrying device 17 has a pair of guide members 24L and 24R on which a multiplicity of support rollers 23 for supporting the lower surface of the pallet 13 are mounted, a pair of transport rails 25L and 25R extending parallel to the guide members 24L and 24R, pallet transport bases 27L and 27R having pallet engagement portions 26 for engagement with the pallet 13 and movable along the transport rails 25 and 25R, and a linear motor mechanism (not shown) for driving the pallet transport bases 27L and 27R.

In the docking station ST2, a pair of left and right fore clamp arms 30L and 30R and a pair of left and right rear clamp arms 31L and 31R are provided to support struts of the front suspension assembly and struts 15A of the rear suspension assembly 15 to set the same in assembled positions at the time of fitting of the front suspension assembly and the rear suspension assembly 15. The left and right fore clamp arms 30L and 30R are respectively attached to attachment plate members 32L and 32R so that they in advance or retreat in a direction perpendicular to the transport rails 25L and 25R, while the left and right rear clamp arms 31L and 31R are respectively attached to attachment plate members 33L and 33R so that they can also advance or retreat in a direction perpendicular to the transport rails 25L and 25R. The left and right fore clamp arms 30L and 30R and the left and right rear clamp arms 31L and 31R have, at their respective opposite extreme ends, engagement portions engageable with the struts of the front suspension assembly and the rear suspension assembly 15. An arm slide 34L enables the attachment plate member 32L to move relative to the fixed base 35L in a direction parallel to the transport rails 25L and 25R. An arm slide 34R enables the attachment plate member 32R to move relative to a fixed base 35R in a direction parallel to the transport rails 25L and 25R. An arm slide 36L enables the attachment plate member 33L to move relative to the fixed base 37L in a direction parallel to the transport rails 25L and 25R. Furthermore, an arm slide 36R enables the attachment plate member 33R to move relative to the fixed base 37R in a direction parallel to the transport rails 25L and 25R. Consequently, the left and right fore clamp arms 30L and 30R are movable in each of the longitudinal and widthwise directions of the carrying device 17 while their extreme end portions are engaged with the struts of the front suspension assembly. Also, the left and right rear clamp arms 31L and 31R are movable in each of the longitudinal and widthwise directions of the carrying device 17 while their extreme end portions are engaged with the struts 15A of the rear suspension assembly 15. The left and right fore clamp arms 30L and 30R, the arm slides 34L and 34R, the left and right rear clamp arms 31L and 31R, and the arm slides 36L and 36R constitute the docking device 40.

The docking station ST2 is further provided with a pair of slide rails 41L and 41R extending parallel to the transport rails 25L and 25R, a slide device 45 including a movable member 42 slidable along the slide rails 41L, and 41R and a motor 43 for driving the movable member 42. On the movable member 42 of the slide device 45, is provided an engagement means 46 for engaging with a movable engine support member (not shown) provided on the pallet 13, and a pair of lifting pallet reference pins 47 for setting the pallet in a predetermined position. When the engine 14, the front suspension assembly and the rear suspension assembly, 15 placed on the pallet 13 are set in combination with the body 11, supported by the lifting hanger frame 22 of the transfer device 16. The engagement means 46 of the slide device 45 is moved along the rails 41L and 41R while engaging with the movable engine support member positioned by the lifting pallet reference pins 47 on the pallet 13 to move the engine 14 relative to the body 11 in the same direction, thereby avoiding interference between the body 11 and the engine 14.

In the screwing station ST3 are disposed a robot 48A for screwing operation of fixing to the body 11 the engine 14, and the front suspension assembly set in combination with the body 11. Another robot 48B for screwing operation of fixing to the body 11 the rear suspension assembly 15 set in combination with the body 11. A pair of lifting pallet reference pins 47 for setting the pallet 13 in a predetermined position are also provided in the screwing station ST3.

In the vehicle assembly line described with reference to FIGS. 2 to 4, the positioning unit 19 and the transfer device in the positioning station ST1, the docking devices 40, the slide device 45 and the pallet transport unit 17 in the docking station ST2, and the robots 48A and 48B in the fastening station ST3 are controlled in a sequential manner based on a sequential control program formed by a program composition apparatus in accordance with this embodiment. That is, the positioning unit 19, the transfer device and so on are "equipment units" which are the objects of the sequential control.

<OPERATION BLOCKS AND OPERATION STEPS>

The assembling operation of the production line shown in FIGS. 1 and 2, i.e., the operations effected by all the equipment units which are the objects of sequential control can be separated into a plurality of "operation blocks". Each operation block is defined as described below.

① : An operation block includes a set of a plurality of unit operations. One of the most important properties of an operation block resides in that ② : the operation of each operation block can be completed independently of other operation blocks without any interference during the intermediate process between the start and the end of the operation block.

Because of the properties ① and ②, each operation block can be described as a block (batch). In other words, each operation block relates to other operation blocks only at operation block level. To start the operation of one operation block, the termination of the operation of at least one other operation block is required. That is, the termination of the operation of one operation block is used as the condition for starting another operation block (or a plurality of operation blocks) connected to it, or the termination of the operation of a plurality of operation blocks is used as the condition for starting another operation block.

According to the above-mentioned properties, no intermediate stage of the operation of one operation block, initiates other blocks. Also, at any intermediate step of one operation block, no start-up from other blocks is waited.

The following incidental property ③ of the operation block can be induced from the definition of the operation block shown in ①　and ②. ③: Preferably, each operation block is the greatest of possible sets of unit operations having the properties ① and ②.

The property ③ is not absolutely necessary. However, if the condition ③ is satisfied, the number of blocks with which the production line is described is reduced and the description of the whole process is simplified and is easy to read.

④: The operation block is restricted based upon the type of the operations to be operated. That is, the operations of the devices can be roughly categorized into "repeating operation", "consecutive operation", and "robot operation". The present system generates a ladder program from standard ladder patterns which will be described later. Since a ladder pattern is much changed if the operation is changed, devices which perform the same type of operations are collected in each operation block. The property ④ is not absolutely necessary to generate the ladder program since the condition ④ is set from the point of view of the program efficiency.

Figure 4A:
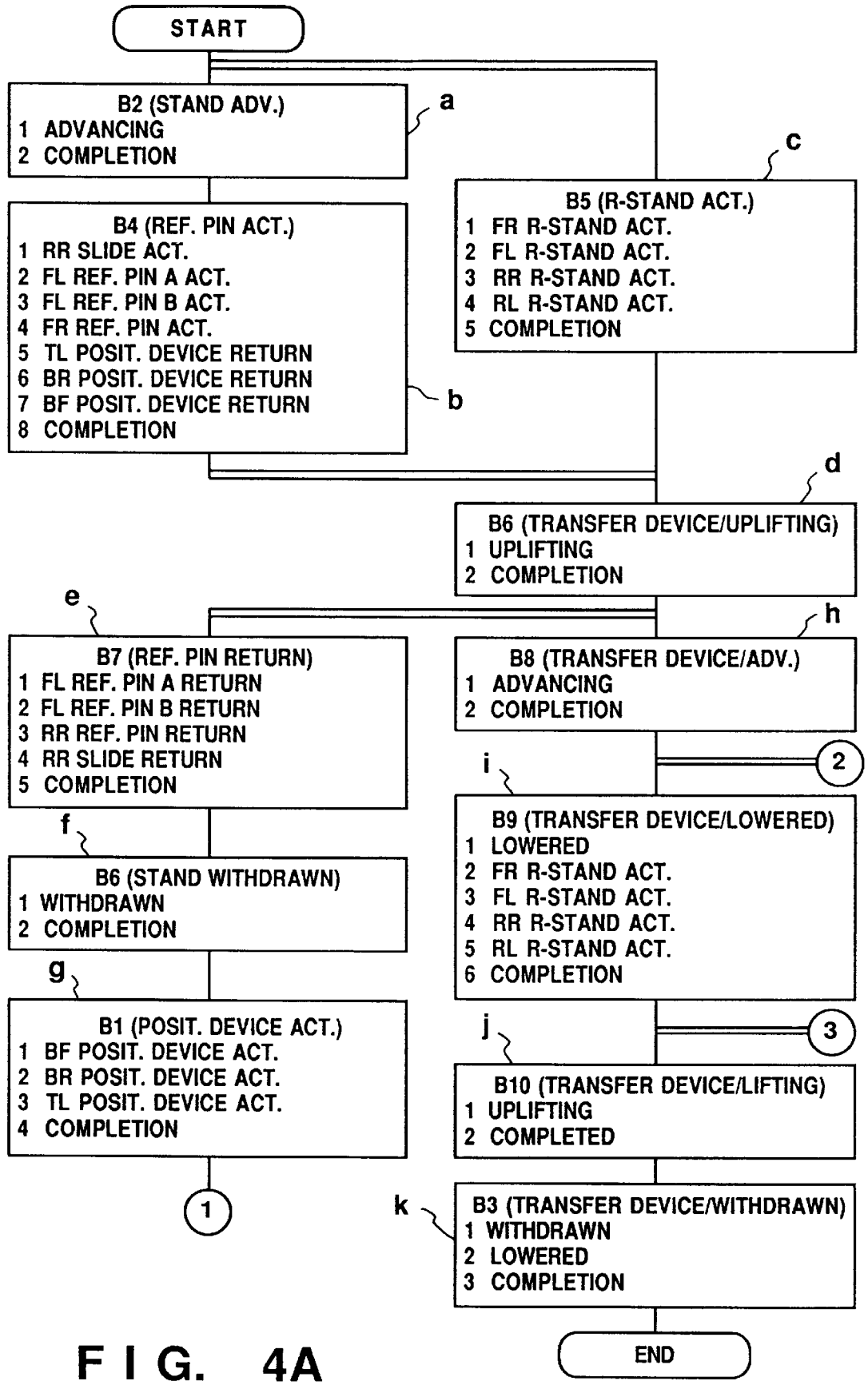
FIGS. 4A, 4B, and 4C are flowcharts referred to as "block charts" in which the operations in the production line shown in FIG. 1 are grouped into blocks.
Figure 4B:
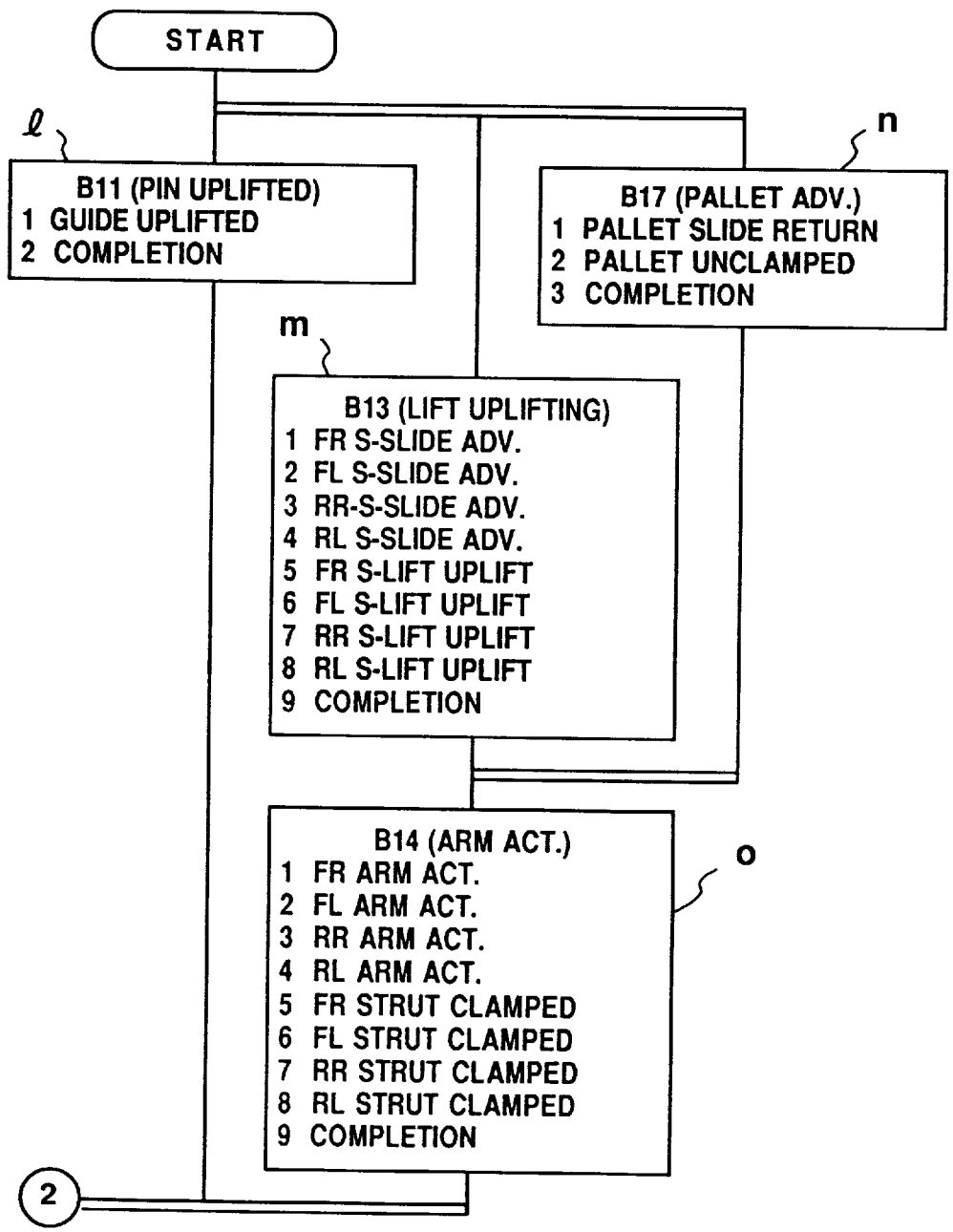
Figure 4C:
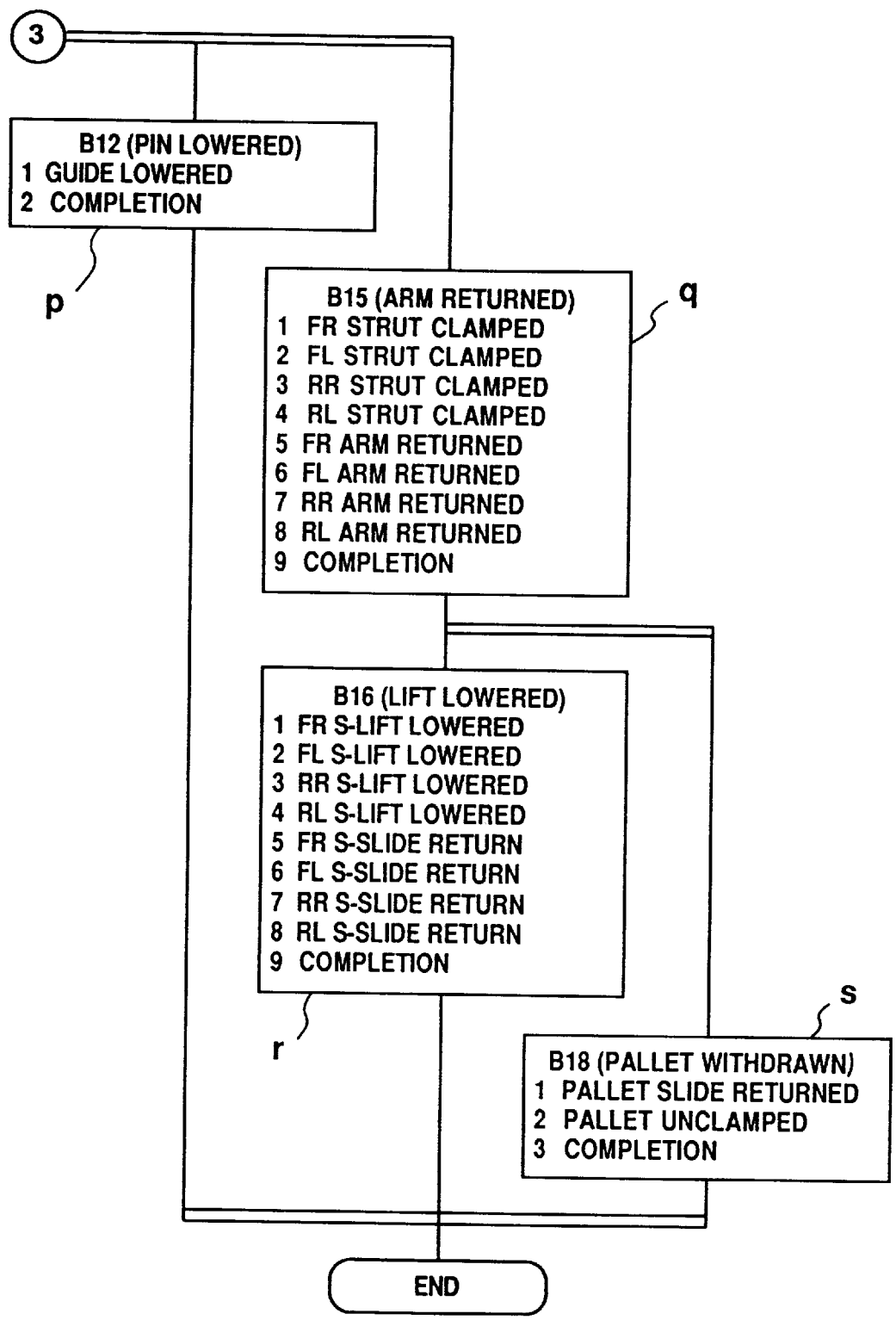

FIGS. 4A, 4B and 4C show the overall flow of the operations in the production line in FIGS. 1 and 2. The production line shown in FIGS. 1 and 2 is described with operation blocks satisfying the conditions ① to ③, thereby obtaining nineteen operation blocks a to s as shown in FIGS. 4A, 4B, and 4C. The block diagrams are attained in a manner such that the operator analyzes the operations in the production line in FIGS. 1, 2, and 3. In FIGS. 4A, 4B, and 4C, a widthwise double line which connects two or more blocks indicates that the operations of the blocks are operated in parallel . In the case where two operation blocks are longitudinally connected by a solid line, the operation of the lower block is started after the operation of the upper oblation block is completed. Furthermore, a square in double line indicates a head of the block.

The operation block a indicates an operation for advancing the receiving stands 12 and is referred to as "STAND ADVANCING". As the block a, "STAND ADVANCING", is completed, the block b which is referred to as "REFERENCE PIN ACTUATED" is operated in parallel to the block c, "RECEIVING STAND ACTUATED". In the block b, the reference pins (FL and FR) are driven to the respective operation positions of "ACTUATED" and the positioning means, i.e. TL positioning means, is activated to the position of "RETURNED". In the block c, the receiving stand 12 is transferred to the docking position. The block d is referred to as "TRANSFER DEVICE/UPLIFTING" and the transfer device 16 is lifted at the station ST1.

As the operation of the block d is completed, the operation blocks are branched into two flows and operation blocks of each flow are successively processed. That is, the block e, "REFERENCE PIN RETURNED", and the block h, "TRANSFER DEVICE/ADVANCING" are operated in parallel after the block d, "TRANSFER DEVICE/UPLIFTING". In the block e, the reference pin which was actuated in the block b is returned to the position of "RETURNED", while in the block h, the transfer device 16 is advanced to the station ST2. Following to the block e, the block f which is referred to as "STAND WITHDRAWING" where the receiving stand 12 is withdrawn.

In the guide, strut clamp, and pallet slide portions, the block 1 ("PIN UPLIFTING"), the block m ("LIFT UPLIFTING"), and the block n ("PALLET ADVANCING") are executed simultaneously. In the case where the blocks m and n are completed, the block o ("ARM ACTUATED") is executed.

When the operations of the blocks 1 and o are completed, the operation block i "TRANSFER DEVICE/LOWERED" is executed.

The flowchart which comprises the set of the operation blocks in FIGS. 4A, 4B, and 4C describes grouped blocks satisfying the conditions ① to ④. As described above, the operator forms a flowchart by the flowchart generating program which will be described later. The name of each operation block expresses characteristics of a plurality of operations in each block as described in the characteristic ii. The system according to the present embodiment is characterized in that the name of each operation block is unique and the operation block can be identified with the name by software programs.

Figure 5:
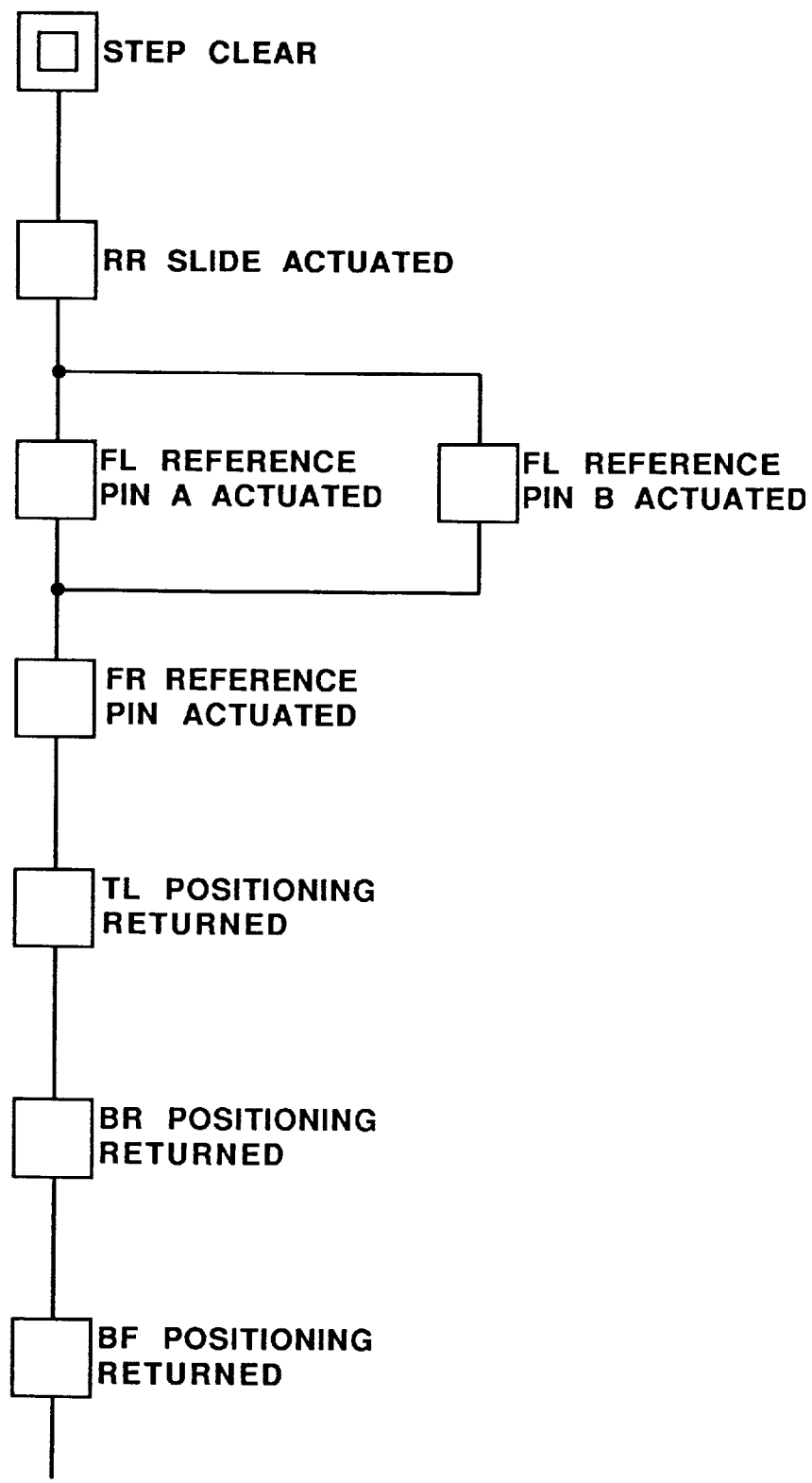
FIG. 5 is a flowchart referred to as an "operation step flowchart" which shows the operation of the block b in FIG. 4A.

Each operation block comprises of a plurality of operation steps. An operation in an operation step is generally symbolized by cylinder model. FIG. 5 is an explanatory flowchart composed of a plurality of the operation steps in the block b "REFERENCE PIN ACTUATED". The label which is assigned to each step is the name of the step named by the operator. According to the flowchart in FIG. 5, the right rear slide rail 41R is set to the state of "ACTUATED" in the step of the "RR SLIDE ACTUATED". In the steps of the "FL REFERENCE PIN A ACTUATED" and "FL REFERENCE PIN B ACTUATED", the reference pin A (left fore) for positioning the body 11 at the receiving stand 12 are set to the state of "ACTUATED". In the step of the "RR REFERENCE PIN ACTUATED", similarly, the right rear reference pin B is set to the state of "ACTUATED". Furthermore, in each of the "TL POSITIONING DEVICE RETURNED", "BR POSITIONING DEVICE RETURNED", and "BF POSITIONING DEVICE RETURNED", the positioning means TL, BR, and BR are returned to the position of the "RETURNED". Thus, the block b, "REFERENCE PIN ACTUATED", in FIG. 4A is expressed by the step operation as shown in FIG. 5. The operation step flowchart is also generated by the above-described flowchart generating program.

Figure 6A:
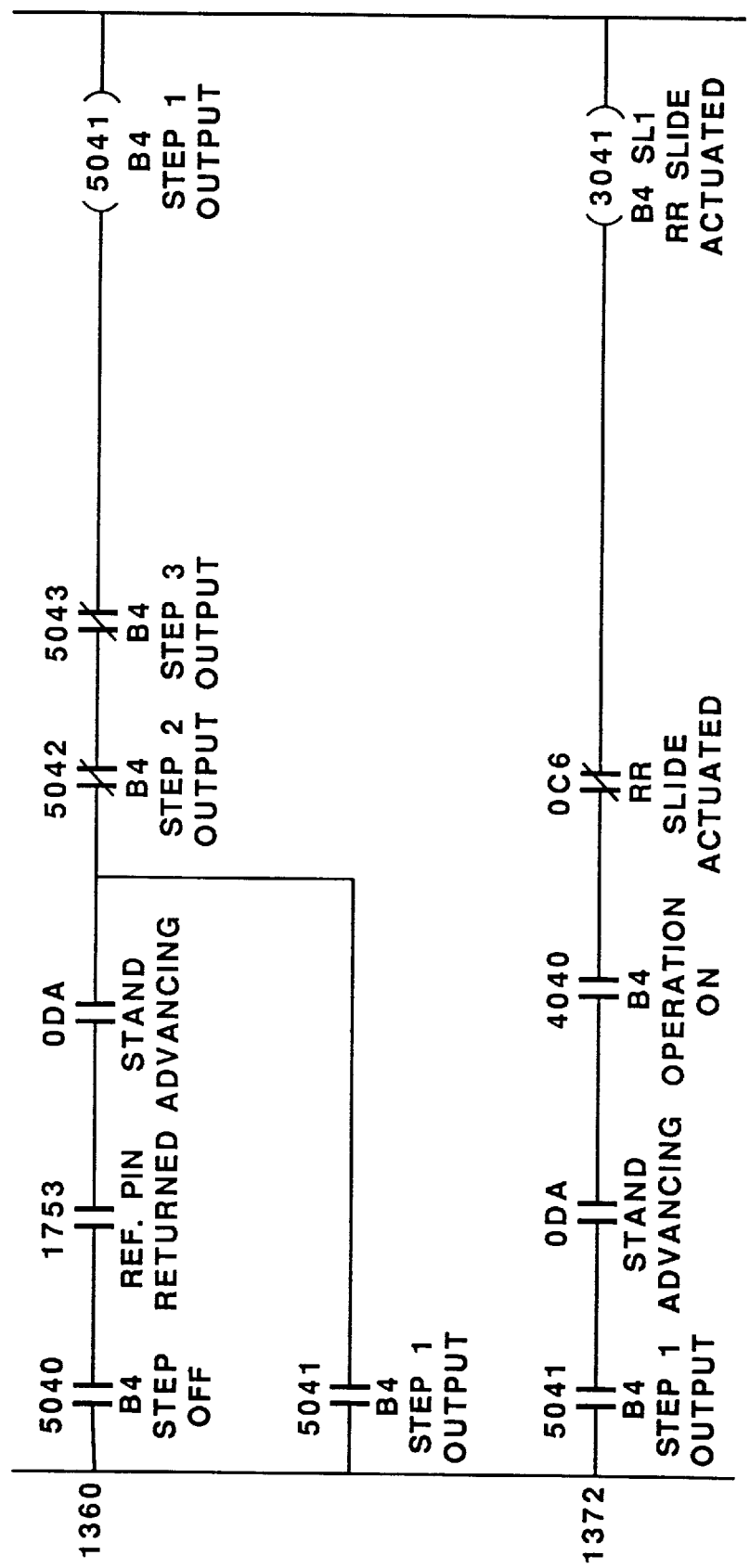
FIGS. 6A, 6B, and 6C are diagrams of an example of a ladder program, all which represent a part of the operation shown in FIG. 5.
Figure 6B:
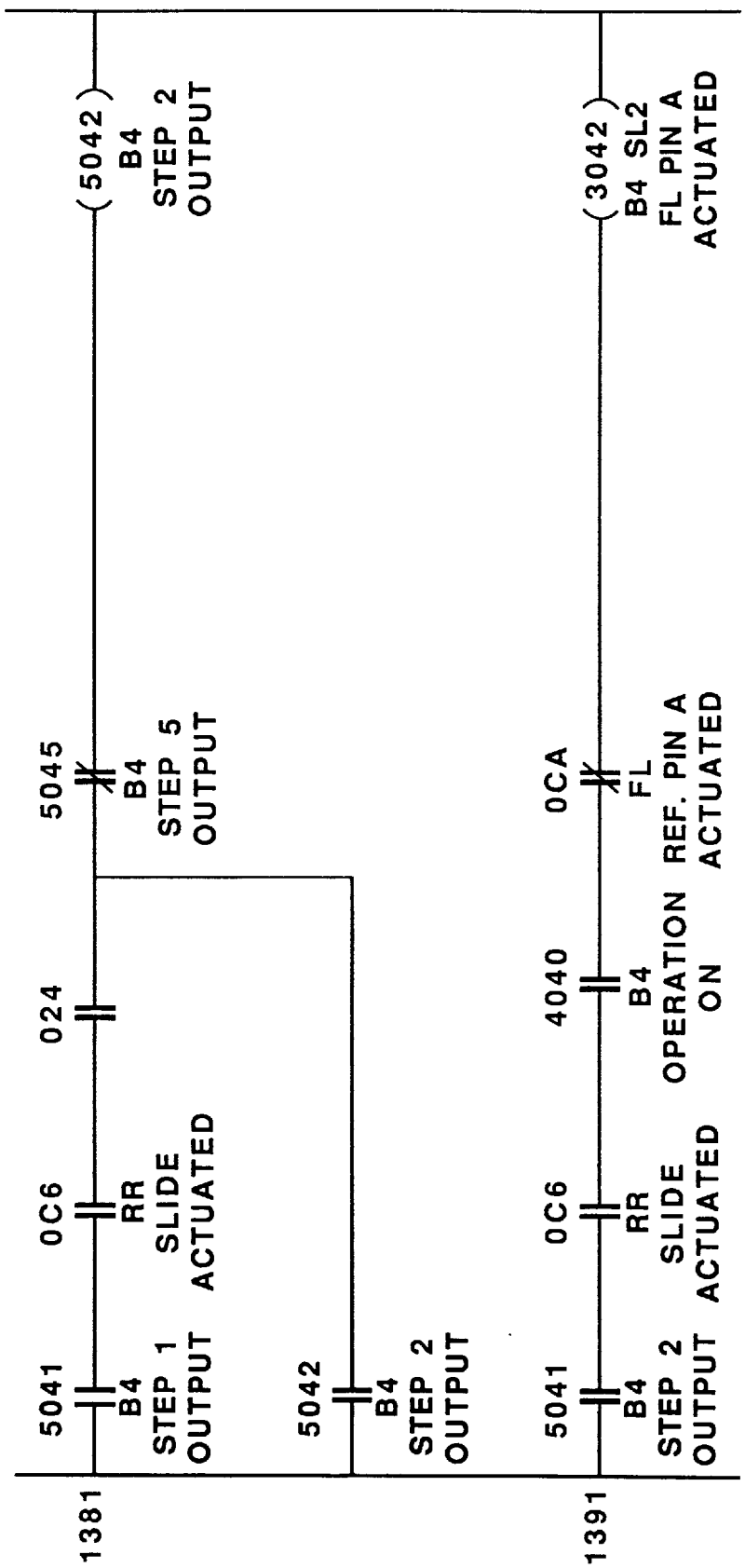
Figure 6C:

An operation step flowchart as shown in FIG. 5 expresses the operations of an operation block. Each label of the operation flowchart identifies the actuator device and expresses the operation of the actuator device. For example, the step where the RR reference pin is set to the state of "ACTUATED" is named as "RR REFERENCE PIN ACTUATED". The first half of the name, "RR REFERENCE PIN", specifies the actuator which is driven in the operation step and the second half indicates the activated state of the actuator. In other words, for the operators and apparatus which can understand the meaning of the names given to the operation block and operation step of the flowcharts as shown in FIGS. 4A–4C and 5, it is easy to recognize that these flowcharts express the operations in the production line in FIG. 1. The target of the sequential control program generating system is to generate ladder programs, e.g. the ladder programs as shown in FIGS. 6A, 6B, and 6C, from the flowcharts in FIGS. 4A–4C and 5.Furthermore, the ladder programs in FIGS. 6A, 6B, and 6C are ladder program elements corresponding to a part of the operation in the block b shown in FIG. 5.

<LADDER PROGRAM>

Symbols of the ladder programs are now to be described. Unit itself, e.g. a lifting reference pin in the production line in FIG. 1, is not an object for control in the ladder program, however, an actuator or a solenoid, which drives the unit is the object. The units of the production line can be represented by a cylinder actuator shown in FIG. 7A. The actuator is provided with the states of "ACTUATED" and "RETURNED" based on the position of the piston which moves to left and right in the cylinder in the diagram. The position is set to the state either "ACTUATED" or "RETURNED" in a manner such that the solenoid valve is either energized or deenergized based on input signal $B_0$. These two states are confirmed by two limit switches. That is, there are two outputs from the "unit" in FIG. 7A: Output $A_0$ from the limit switch ("OUTPUT CONFIRMATION" signal) for confirming being driven and output $A_1$ from the other limit switch ("RETURN CONFIRMATION" signal) for confirming being returned to the home position.

Figure 7A:
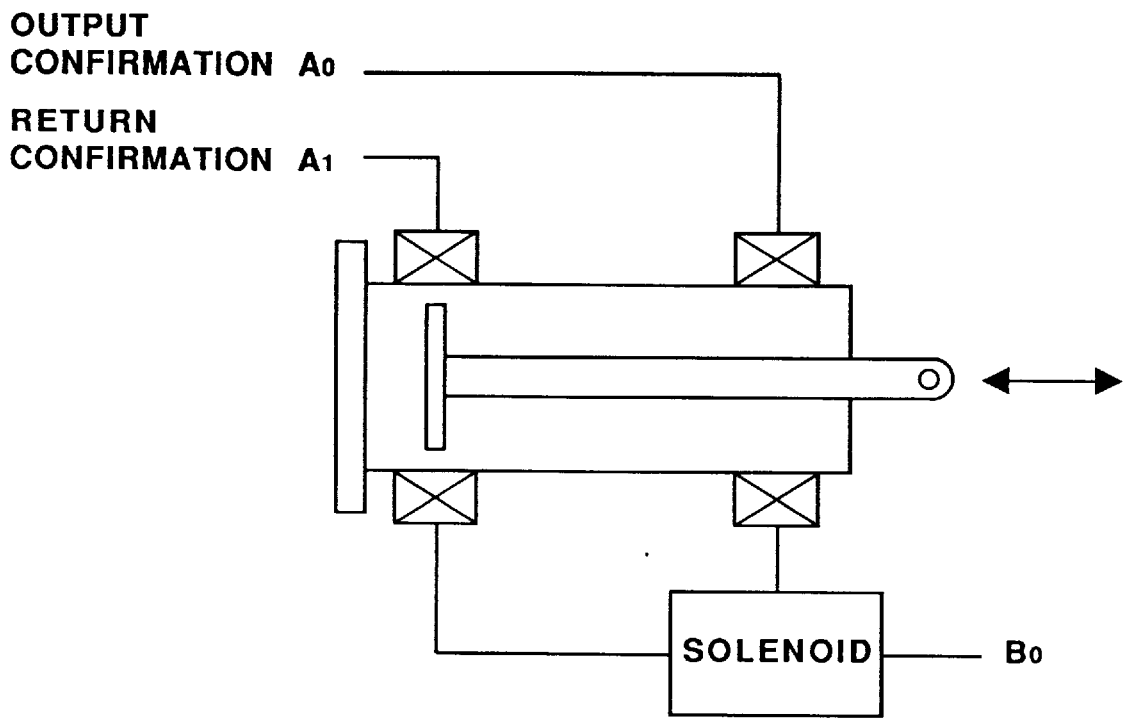
FIG. 7A is a diagram of a symbolized unit in the production line.
Figure 7B:
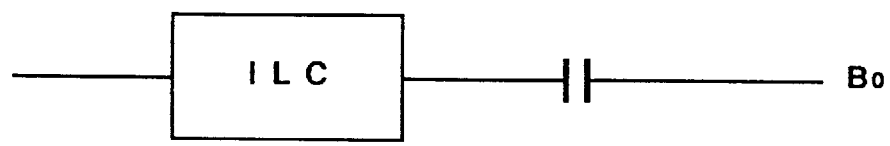

Fig.7B is a diagram which explains the logic of the output drive operation of the solenoid shown in FIG. 7A. To turn on the solenoid, interlock conditions ILC need to be satisfied. The interlock conditions ILC generally include various kinds of unique starting conditions which correspond to each operation step. These interlock conditions ILC include a confirmation signal (i.e. $A_0$ in FIG. 7A) indicating that the state of the output of the preceding operation step is confirmed, since the completion of the preceding operation step is a condition for execution for each operation step.

Figure 7C:
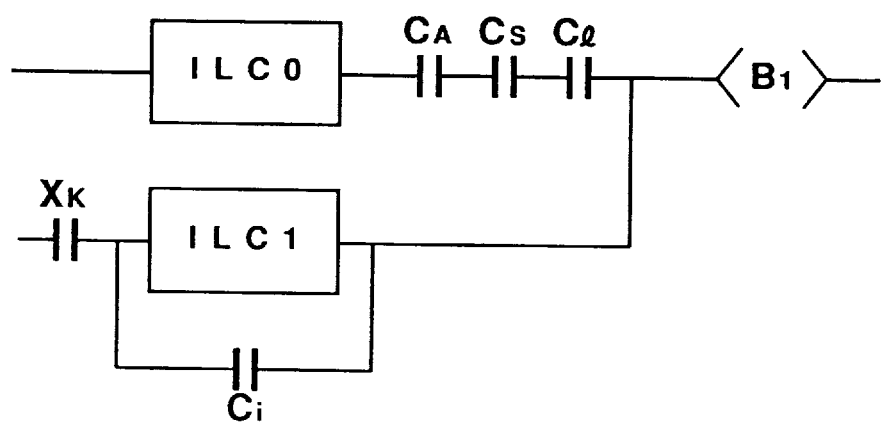

FIG. 7C illustrates an example of a standard operation circuit used in generating the whole sequence control program. Referring to FIG. 7C, a condition $C_A$ is closed in an automatic mode (in which the operations of the production line are performed in accordance with the sequential control program). The condition $C_S$ is closed when this operation circuit is operated in a manual mode. The condition $C_S$ is normally closed.

Therefore, in the normal automatic mode, output $B_1$ is outputted if the interlock condition $ILC_0$ and the operation condition $C_I$ are satisfied. On the other hand, the $ILC_1$ describes the logic of an operation condition in the manual mode. Since the contact $C_S$ is opened in the manual mode, $B_1$ is outputted if conditions $X_k$ and $ILC_1$ or the conditions $X_k$ and $C_i$ are simultaneously satisfied. Ordinarily, $C_i$ is a logic for nullifying the interlock condition $ILC_1$ in the manual operation.

Figure 8A:
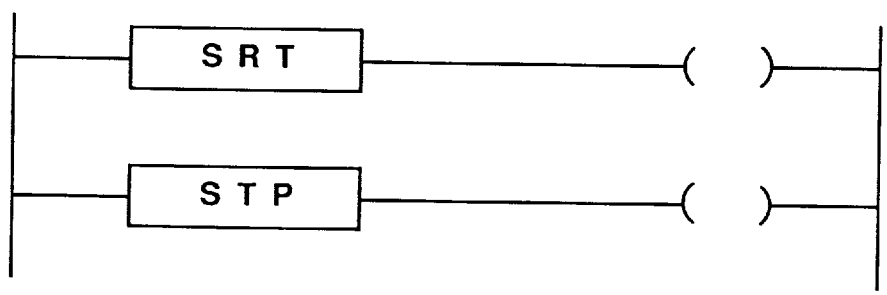

The ladder pattern in FIG. 7C is a standard pattern which is used to express a ladder program element in an operation step. Other ladder patterns according to the present system are shown in FIGS. 8A, 8B, and 8C. FIG. 8A is a diagram which expresses 'start' and 'stop' of the operation block. FIG. 8B is a similar diagram to the one in FIG. 7C. FIG. 8C is a diagram showing a pattern in which a further condition $X_i$ is added for the contact conditions.

The labels 1360 and 1372 in FIG. 6A are the ladder program elements corresponding to the "RR SLIDE ACTUATED" step in FIG. 5. In the logic of the label 1360, the "B4 STEP 1 OUTPUT" (B4 STEP1 OUTPUT) of the address 5041 outputs "1" in the case where the following equation is satisfied:

$$(B4\_STEP\text{-}OFF * REFERENCE\_PIN\_RETURNED * STAND\_ADVANCING + B4\_STEP1\_OUTPUT) * B4\_STEP\_2\_OUTPUT / * B4\_STEP\_3\_OUTPUT /= 1$$

The "/" denotes the logic "NOT" and the "B4 STEP OFF" indicates that all the steps in the block B4 are off (that is, not executed). The "REFERENCE PIN RETURNED" and "STAND ADVANCING" of the address 1753 indicates that the completion in the block of "STAND ADVANCING" which is preceding the block B4 of "REFERENCE ACTUATED". Similarly, what the "B4 STEP 2 OUTPUT/" and the "B4 STEP 3 OUTPUT/" indicate can be easily expected. Thus, the operation of the label 1360 expresses the condition that the first operation step "RR SLIDE ACTUATED" in the block of "REFERENCE PIN ACTUATED" is correctly started. Therefore, in the case where all the operation steps are completed in the "STAND ADVANCING" block, the condition is satisfied and the "B4 STEP 1 OUTPUT" becomes "1". Once "B4 STEP 1 OUTPUT" became "1", the "B4 STEP 1 OUTPUT" remains to be "1" by the condition of the latch condition of the label 1360.

In the case where the output "B4 ST1 RR SLIDE ACTUATED" of the label 1372 in FIG. 6A becomes "1", the following equation was satisfied:

$$B4\_STEP\_1\_OUTPUT * STAND\_ADVANCING * B4\_OPERATION\_ON * RR\_SLIDE\_ACTUATED/=1$$

The "B4 ST1" refers to the first step of the block B4. The "RR SLIDE ACTUATED" is operated in the case where the "B4 STEP 1 OUTPUT" becomes "1" and the step of "STAND ADVANCING" is executed under the state that the actuator, the "RR SLIDE", is not turned on.

It can be easily understood that the ladder programs in FIGS. 6B and 6C correspond to the two operation steps, "FL REFERENCE PIN A ACTUATED" and "FL REFERENCE PIN B ACTUATED" respectively.

Thus, in the case where the block B4 ("b"), "REFERENCE PIN ACTUATED", in FIG. 4 is expressed in the form corresponding to the operation step flowchart in FIG. 5, it can be understood that the three steps, "RR SLIDE ACTUATED", "FL REFERENCE PIN A ACTUATED", and "FL REFERENCE PIN B ACTUATED" correspond to the ladder programs in the diagrams in the FIGS. 6A, 6B, and 6C.

<NOTION OF THE SYSTEM>

As described above, the main target of the present system is how to improve efficiency in process management of the production line. As described in the characteristic ii, the main concern is how the functions of generating the ladder program and simulation of the generated ladder pattern are automated. In addition, how the functions, i.e. a system management under an actual operation of the generated program or during the simulation and a fault diagnosis thereof, are automated is concerned.

Figure 9:
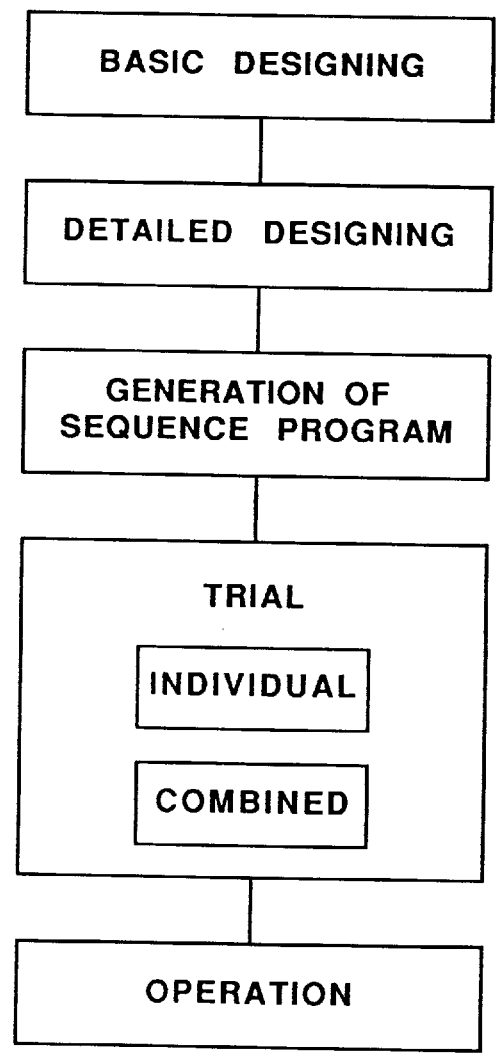
FIG. 9 is a flowchart generally representing steps to develop the system which manages the production line.
Figure 10:
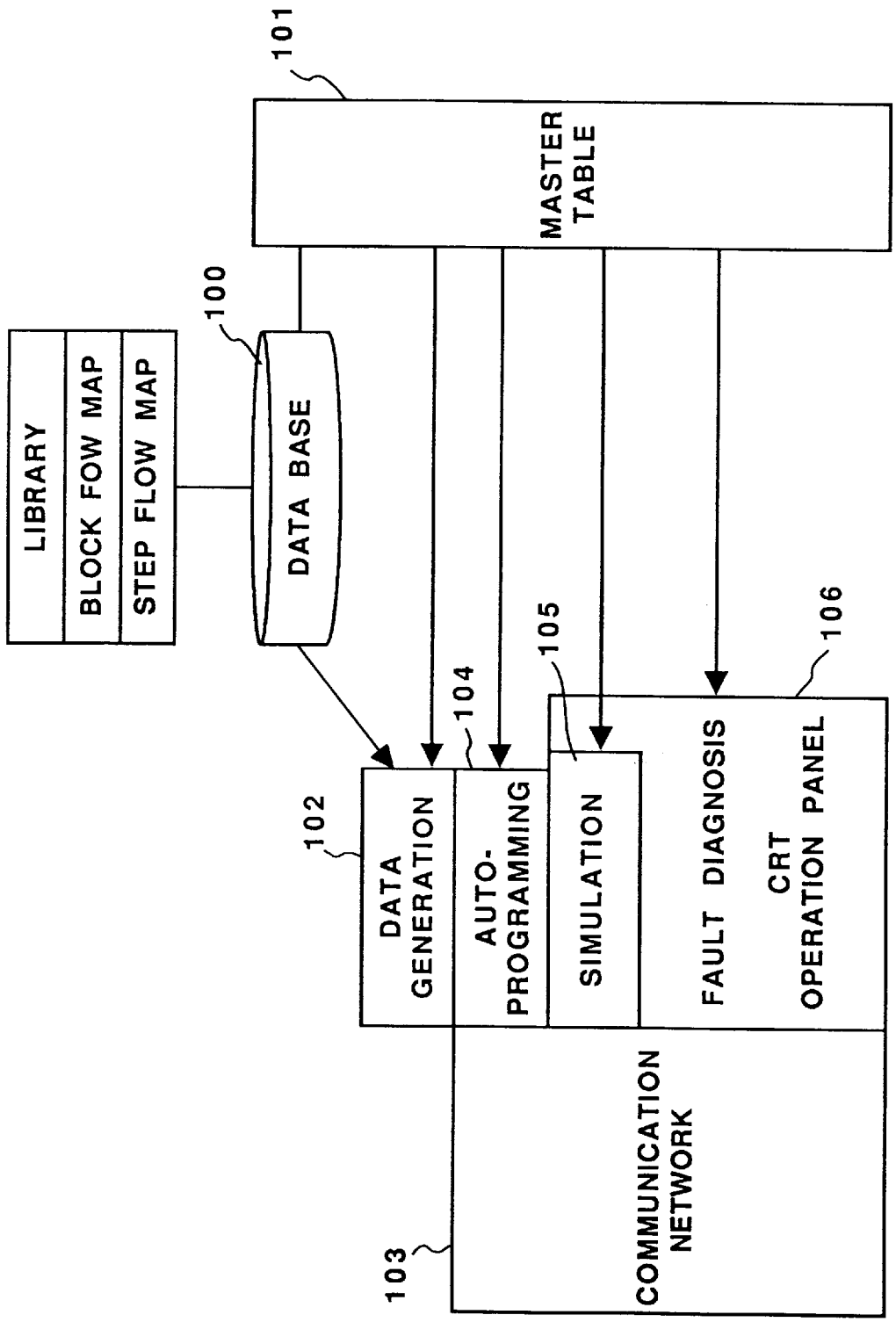
FIG. 10 is a diagram which shows the mutual relation between programs and the data in the system according to the present embodiment.

FIG. 9 is a diagram which expresses the general notion of procedure in which the system managing the assembling process is installed in the production line. FIG. 10 is a diagram which shows the configuration of the functions, which are required for the system according to the present embodiment.

As shown in FIG. 9, the installation of the production line and the management system are expressed in the processes, basic design, detailed design, generation of a sequence program, trial of the program, and actual operation. The system shown in FIG. 10 is particularly powerful in the processes of the "generation of the sequence program", "trial", and "operation". In FIG. 10, the master table 101 has the tabulated names of the devices and the types of the operation of the devices concerning all the units (actuator devices) in the objective production line and names of an input/output signal where the devices are expressed in symbols as shown in FIG. 7A–7C. FIG. 13 shows a detailed example. Since the master table 101 expresses the actual relation between an input and an output in each device, it will be referred as to an a "actual I/O map" below. The data base 100 includes the library which stores the names of all the units (i.e. actuator devices) which are used for this production line. This library is arranged in order to exclude arbitrariness by users or operators. The data base 100 further includes the "block flow map" and the "step flow map". A block flow map as shown in FIG. 11 enables computerized data processing, which is obtained by converting the operation block flow chart shown in FIG. 4, which can be easily understand by the operator, into a map. The step flow map enables data processing of the computer by converting the operation step flowchart as shown in FIG. 5 into a map.

The system shown in FIG. 10 comprises the four subsystems such as "data generation", "auto-programing", "simulation" and "fault diagnosis/CRT operation panel" in addition to the "I/O map" in the above-mentioned data base 100 and master table 101.

The subsystem, "auto-programing", generates the ladder program for the sequential control based on the "actual I/O map" both in the data base 100 and the master table 101. The data generation program 102 generates or formulates the "actual I/O map" in the data base 100 and the master table 101 and also modifies the I/O map. This subsystem is mainly adopted for the process of the "sequence program generation" (FIG. 9). The subsystem, "auto-programing", forms the ladder program in a manner such that the "block flow map " and the "step flow map" (these maps express the production line to be an object for generation of the ladder program) are connected to the "I/O map" which generally expresses the relation between an input and an output used in the production line. The connection is performed in a manner such that the names of the blocks, steps or devices used for the "block flow map" or "step flow map" are linked to the names of the devices which are stored in the "I/O map".

The subsystem 105, "simulation", generates the program to simulate the ladder program generated by the subsystem 104, "auto-programing". The generated simulation program is mainly used in the precess of the "trial" in FIG. 9.

The subsystem, "fault diagnosis/CRT operation panel", diagnoses result of the simulation in the "trial" process or "operation" process in FIG. 9 or fault in the actual operation process. The result of the diagnosis is displayed mainly on the CRT display device. In the display device, the name of a place where a fault has occurred is searched by the name of the device in the I/O map so that the operator can easily recognize.

As described above, the main data in the present system is the "I/O map" in the master table 101 (FIG. 13) and the ladder program and the simulation program are generated in a manner such that the "I/O map" and the block flow map and the step flow map are "organically" linked. The configuration of the hardware in the accordance with the present system is now to be described and then the aforementioned three maps are described.

<HARDWARE CONFIGURATION>

Figure 14:
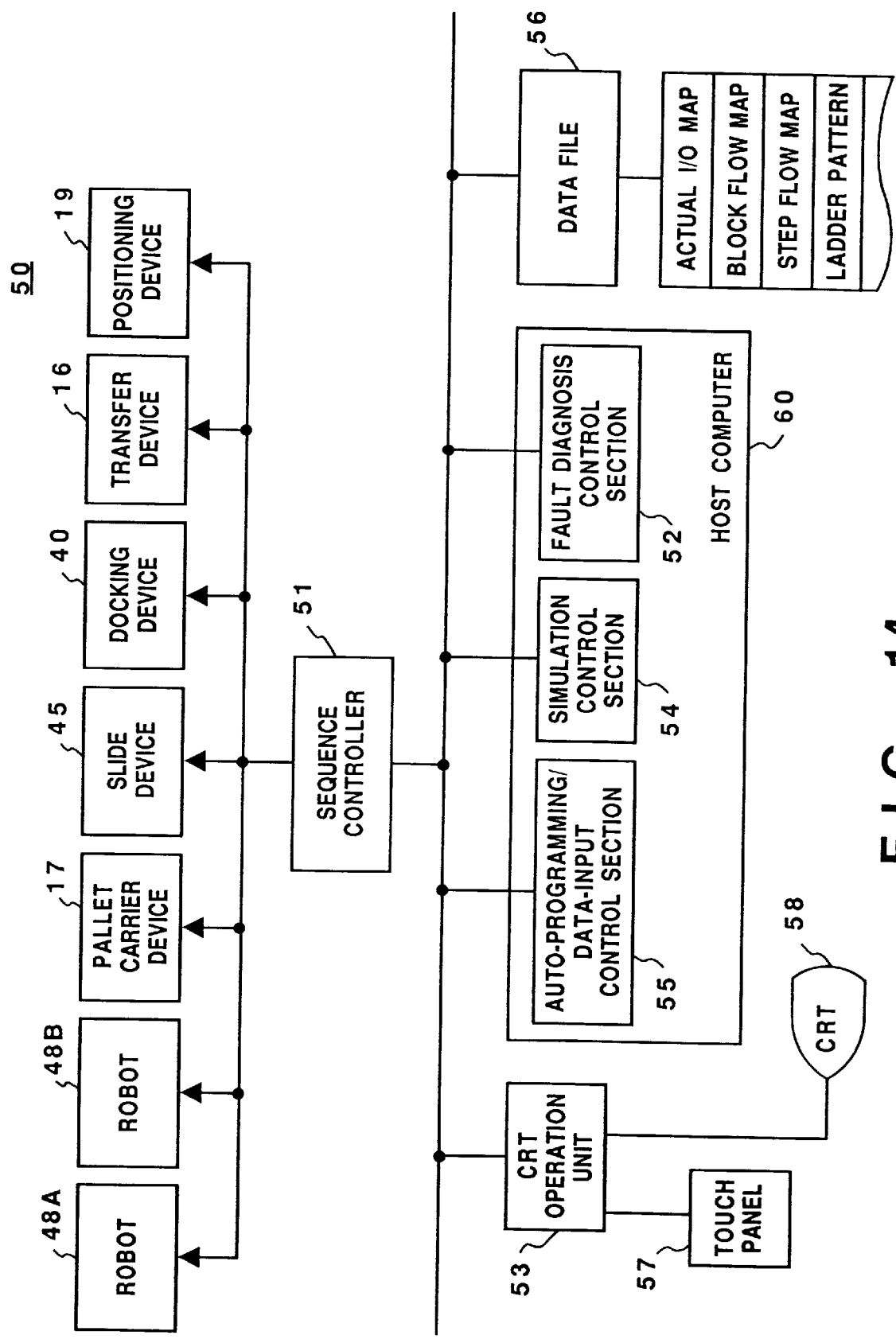
FIG. 14 is a diagram of the hardware configuration of the present embodiment.

FIG. 14 is a diagram showing the system described in FIG. 10 which is expressed from the point of the view of the hardware. As shown in FIG. 14, the system comprises the units 50 which are the object for control (corresponding to various kinds of the units in FIG. 1), the host computer 60, the CRT panel control unit 53 which controls the CRT as a user interface, and the data file 56 which stores the aforementioned maps and the data base. The host computer 60 further comprises the auto-programing/data-input-control section 55 which performs generation of the ladder program and the maps, the fault diagnosis control section 52 which performs the fault diagnosis, and the simulation control section 54 which performs the simulation control. These units or sections are connected through the communication line 61. A semiconductor memory device is appropriate for he data file 56 for high speed processing.

The CRT panel control 53 further comprises the touch panel 57 which is placed on the display screen in addition to the CRT display device 58. In accordance with the present system, the interface with the operator is required in the processes of auto-programing, simulation, and fault diagnosis. The control unit 53 displays a plurality of windows on the CRT 58 by the known multi-window display control and the operator can select any desired item among a plurality of items in the displayed window through the touch panel 57. It is needless to say that a pointing device can be used instead of the touch panel 57.

Figure 15A:
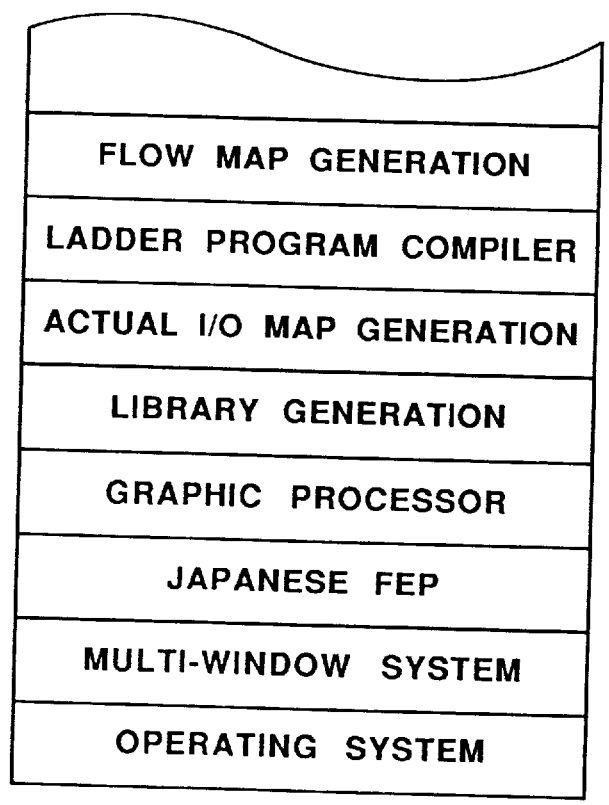
FIG. 15A is a diagram of the structure of the automatic-programing/data-inputting portion in the system.

FIG. 15A shows the layout of the programs in the auto-programing/data-input-control section 55. The lowest layer stores an operating system and the rest of the programs are the multi-window system, the Japanese front end processor (JFEP) which subjects data to Japanese processing, the graphic drawing processor which draws graphics, a program which generates the libraries, the programs which generate the I/O map and the flow map respectively, and a compiler which generates ladder programs (FIG. 6) from the flow maps.

The graphic drawing processor is a processor which generates the flowcharts in FIGS. 4A–4C and 5 and which is capable of performing a function of writing a box as a symbol in flowchart, function of naming each box, and a function of connecting the plurality of boxes. During the operation of the graphic drawing processor, items which are capable of being inputted from the library in the data file 56 are displayed in the multi-window mode. The "items" means the literal data of the aforementioned names of devices, operation steps, and operation blocks. Any desired input is possible in a manner such that the operator selects a particular item through the touch panel 57. Furthermore, names which are not registered in the library can be freely inputted by the help of the JFEP. The reason why all the items capable of being inputted are window-displayed and a desired item can be selected is to prevent the names being arbitrary. Since the multi-window control system, the graphic drawing processor, and the JFEP are well known, the explanation thereof is needless. However, the main function of the JFEP is that the input of Japanese words which were read in Roman characters are converted to a sentence with Kanji (Chinese characters) and Kana (Japanese syllabary). Of course, the JFEP is not necessary if the present system is used in the English speaking countries.

FIG. 15B shows a part of the data which is stored in the library. The data comprises the fields of "device name" and "operation name". In the case where the aforementioned each type of maps is generated, the data in these fields are separately window-displayed. The reason why the data is divided into two fields in the library is that each device name and operation name should have a specific meaning.

<BLOCK FLOW MAP>

FIG. 11 is a block flow map having an important role in the present system. This map is converted from the operation block flowchart in FIG. 4 by the flow map generating program (FIG. 15A) of the host computer 60 and stored in the data file 56. This map comprises the seven items: "BLOCK NUMBER", "BLOCK NAME", "FROM", "TO", "STEP FLOW MAP POINTER ", "DEVICE TYPE ", and "OPERATION PERIOD". The "BLOCK NAME" is a name which is named for the block. The block can be uniquely specified by the name of the block, however, the block can be more simply identified if a block number is assigned. For example, in the ladder program in FIG. 6, the block number 4 is referred and the name of the signal is referred to as "B4". The "FROM" indicates from which superordinate blocks the block 4 is connected. According to the present embodiment, the block B4 (4) is connected to the superordinate block B2 (2). In the case where a plurality of the block numbers are listed on the "FROM", the block is connected to the plurality of the superordinate blocks. The "TO" indicates to which the subordinate blocks the block 4 is connected. In FIG. 11, the block B4 (4) is connected to the subordinate block B6 (6).

In the case where a plurality of block numbers are listed on the "TO", the block is connected to a plurality of the subordinate blocks. FIG. 11 shows the connecting relation among the blocks in the block flow chart in FIG. 4. As described above, since the graphic drawing processor expresses the connecting relation among boxes as a vector data, it is easy to generate the block flow map in FIG. 11.

The "STEP FLOW MAP POINTER" in the block flow map indicates at which memory address the step flow map of the block (FIG. 12) is stored.

This block flow map is generated from the operation block flowchart in step S16 in FIG. 16 by the auto-programing section 55.

<ACTUAL I/O MAP>

Preceded to the explanation of the step flow map, the actual I/O map is now explained accompanying with FIG. 13. The I/O map defines input and output relation for each actuator device equipped in a production line which is to be designed. In the diagram, the "NAME" refers to the name of an actuator device which is uniquely named. The four other items which define the map are "OPERATION", "OUTPUT B", "CONFIRMATION A", and "MANUAL C". The "OUTPUT B" refers to the data for which the device performs the operation which is defined by the "OPERATION" field when the signal of logical value "1" is written in the memory address specified by the "$B_0$" field. This "OUTPUT B" corresponds to the "$B_0$" in FIG. 7A. The "CONFIRMATION A" indicates the memory address which is referred when the system confirms an operation when the device performed the operation which is defined in the "OPERATION" field. This "CONFIRMATION A" corresponds to the "CONFIRMATION A" in FIG. 7A. The "MANUAL C" writes the logical value "1" in the memory address which is indicated in the "MANUAL C" field.

The I/O map is further explained in detail accompanying with FIG. 13. First, in order that the device of the "BF POSITIONING" performs the operation, "ACTUATED", "1" is written in the address "$B_{A0}$" and the result of the operation is confirmed in a manner such that whether or not "1" has been written in the address "$A_{C0}$". Then, in order that the device of the "BF POSITIONING" performs an operation of "RETURNED", "1" is written in the address "$B_{A1}$" and the result of the operation is confirmed in a manner such that whether or not "1" has been written in the address "$A_{C1}$". Addresses, e.g. "$B_{A0}$" and "$A_{C0}$", correspond to "memory mapped I/O". These addresses correspond to the pin numbers of the backplane of the sequential controller 51 shown in FIG. 14. The pin is connected to the actuator. The sequence controller 51 scans the contents of the memory addresses ("OUTPUT B" and "MANUAL C") and if the content of the address becomes "1", the corresponded actuator is driven. Then, if the confirmation switch (refer to FIG. 6A) is changed in the actuator, the logical value is written at the address, e.g. "$A_{C0}$".

The I/O map is to be generated by the JFEP and the actual I/O map generating program (FIG. 15A) and it is set up that each "NAME" and "OPERATION" field can be searched.

<STEP FLOW MAP>

The step flow map shown in FIG. 12 expresses the actual operation in the production line. The items of the map are "BLOCK NUMBER" which indicates the number of the block, "STEP NUMBER", "STEP NAME", "OPERATION" which describes the type of the "OPERATION" in the step, "FROM", "TO", "OUTPUT B", "CONFIRMATION A", "MANUAL C", and "OPERATION PERIOD". Similar to the case of the block flow map, the fields of "FROM" and "TO" express the relation of the connection between steps.

The "OPERATION PERIOD" is a nominal time period which is required for the step to be operated.

The operation step flowchart (FIG. 5) is generated by the graphic drawing processor (FIG. 15A) and the data is expressed in vector. The first six fields in the step flow map, the data for the "BLOCK NUMBER", "STEP NUMBER", "NAME", "OPERATION", "FROM", and "TO", are generated by the operation step map, which is expressed in vector, in a similar way that the block flow map is generated by the step flow map in step S8 in FIG. 16. The rest of the fields, the data for "OUTPUT B", "CONFIRMATION A", and "MANUAL C", are filled in with the data from the "I/O map in the case where the ladder compiler of the auto-programing control section 55 (FIG. 15A) generates the ladder program.

Figure 18:
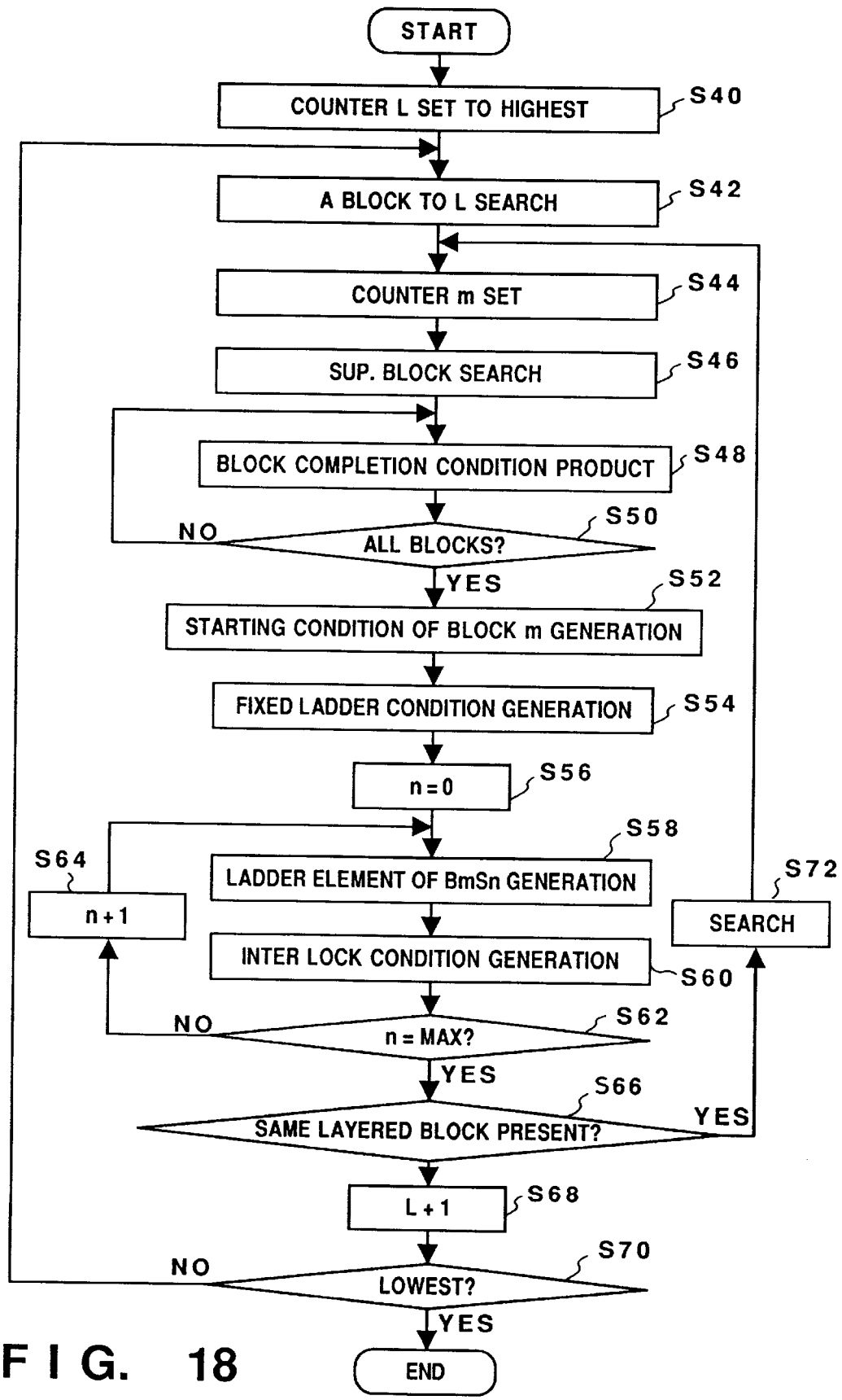

FIGS. 17 and 18 are the flowcharts showing the control procedures of the compiler (FIG. 15A) which generates the ladder program. FIG. 17 is a flowchart which shows the control procedure for generating the step flow map of "OUTPUT B", "CONFIRMATION A", and "MANUAL C". FIG. 18 is a flowchart which generates the ladder program elements.

In steps S10 and S12 in FIG. 17, the counters m and n which respectively indicate the block number and the step number are initialized to "0". In step S14, the block flow map which has been already generated (in step S6) is searched, for the block which has the name corresponding to the counter m. Then, the step flow map which has that block name is searched. If the corresponding map is not searched, the step proceeds to step S30 where the counter m is increased and returns to step S14 via step S32. If the corresponding map is searched, the device which has the name of the step n of the block m ($B_m B_n$) in the step flow map is searched in the I/O map. In steps S20, S22, and S24, the fields of "OUTPUT B", "CONFIRMATION A", "MANUAL C", and "OPERATION PERIOD" which correspond to the searched device are copied in the step flow map. In step S26, the counter n is increased. If the corresponding step flow map is searched, the pointer address of the map is written in the "POINTER" field of the block map (FIG. 11).

Since steps are sequentially arranged in the order of that a device is operated in the step flow map, in the case where the fields of "OUTPUT B", "CONFIRMATION A", "MANUAL C", and "OPERATION PERIOD" are filled in all the steps in the step flow map, the process returns to step S14 and the above-described process is repeated.

<GENERATION OF LADDER PROGRAM>

FIG. 18 is a flowchart which shows the procedure of generation of the ladder program (this program is a part of the auto-programing control section 55) as shown in FIGS. 6A, 6B, and 6C.

In step S40 in FIG. 18, the counter L which indicates a layer number is set to the number which indicates the highest layer.

The "layer number" indicates the level of layer in the block flow chart. According to the embodiment in FIGS. 4A–4C, the blocks a (B2) and c (B5) are referred to as the first layer (L=1), the block b (B4) is the second layer, the block d (B6) is the third layer, the blocks e (B7) and h (B8) are the fourth layer, the block f (B6) is the fifth layer, and the block g (B1) is the sixth layer. Furthermore, the blocks 1 (B11), m (B13), and n (B17) are the seventh layer, the block o (B14) is the eighth layer, the block i (B9) is the ninth layer, the blocks j (B10), p (B12), and q (B15) are the tenth layer, the block k (B3) is the eleventh layer, and the blocks r (B16) and s (B18) are the twelfth layer. The reason why the blocks are divided into the layers is that the starting condition for blocks in the subordinate layers to be driven is only when the operations of the superordinate blocks are completed.

The way to assign the above-described layer numbers is that the blocks which are consecutively operated are grouped and the blocks which are driven in parallel (i.e. the blocks a and c in FIG. 4A) are assigned to as the same layer number. In the grouped blocks which are consecutively operated, each block is assigned the layer number from the top to the bottom. Then, the lowest blocks at the parallel relation will be changed are searched (i.e. the block b).

In step 40 in FIG. 18, the layer counter L is set to the highest level of the layer number. According to the embodiment of FIGS. 4A–4C, the counter L is set to "1". In step S42, one of the blocks which belong to the layer number which is indicated by the counter L is searched. The block number is set to the counter m. In step S46, the superordinate blocks which are higher than this block are all searched. If the counter L is 3, the block which belongs to the layer number 3 is the block d (B6). The blocks which are higher than the block d (B6) are the blocks b (B4) and c (B5). In step S48, the product of the operation completion conditions in the superordinate blocks are generated. More particularly, suppose that the block g ($B_1$) which is higher then the block a ($B2$) comprises four operation steps and that the switch outputs which confirm the completion of each operation step are $A_0$, $A_1$, $A_2$, and $A_3$ respectively. When the block a ($B_2$) is driven, the all operations in the block g ($B_1$) must have been completed. Therefore, the condition for starting the block a ($B_2$) is:

$$A_0{}^* A_1{}^* A_2{}^* A_3$$

Furthermore, in the generation of the conditions for starting a ($B_2$), generally the complementary relation such that the device operations for "ACTUATED" (i.e. "BF POSITIONING ACTUATED") and for "RETURNED" (i.e. "BF POSITIONING RETURNED") are existed. Since logics which are complementary cancel each other, this is not necessary to be included in the aforementioned starting conditions.

Meanwhile, there is another method to search the block which has a parallel operation, i.e. the method that superordinate blocks are searched from subordinate blocks.

In steps from S48 to S50, the product of the operation completion conditions in the all superordinate blocks is generated. In step S52, a ladder element is generated for the block $B_m$ which is indicated by the counter m as the starting condition of $B_m$. According to the embodiment in FIG. 6A, the ladder element of the label 1360 indicates the condition for drive. The ladder element generated here is an element which meets to the conditions in the standard ladder patterns which are stored to the data base in advance. The method to search the ladder pattern is disclosed in the U.S. application (U.S. Ser. No. 07/590,079; Sep. 28, 1990) and the EP application (No. 90 118 453.1).

In step S54, fixed ladder elements (which are the SRT ladder and the STP ladder in FIG. 8A) are generated.

The steps from S56 to S62 are to generate ladder elements corresponding to all operation steps in a block. First of all, in step S56, the counter n which indicates the step number is initialized to "0". In this case, the step flow map of the number $B_m S_n$ is referred. The memory addresses of "OUTPUT B", "CONFIRMATION A", and "MANUAL C" of the step are referred and the ladder element are generated. In the embodiment of FIG. 6A, the "CONFIRMATION A" is the "RR SLIDE ACTUATED" at the address "0C6" and the "OUTPUT B" is the "B4 ST1 RR SLIDE ACTUATED" at the address "3041". In step S60, the interlock condition for starting the step $B_m S_n$ is generated. To start the operation step, the preceding operation steps must be completed. In this case, the operation completion condition $B_m S_{n-1}$ is the interlock condition for the block $B_m S_n$. In the embodiment in FIG. 6A, the "B4 STEP 1 OUTPUT", "STAND ADVANCING", and "B4 OPERATION ON" are the interlock conditions. The interlock conditions generated in this way become the interlock condition for the operation step $B_m S_{n+1}$ Furthermore, the generation of the ladder element is disclosed in the aforementioned U.S. application (U.S. Ser. No. 07/590,079) and the EP application (No. 90 118 453.1).

After the steps from S56 to S60 are processed to the all operation steps in the block Bm, the process proceeds to step S66. Then, in steps S66 and S72, another block which belongs to the layer number L is searched. If such block is found, the process returns to step S44 and steps from S44 to S62 are repeated for the searched block.

In the case where the processing to the blocks in the same layer number is all completed, the counter L is increased in step S68 and the process proceeds to step 70 where whether or not the above-described processes have been performed in the all layers is examined.

If the processes are performed, the generation of the ladder program is completed.

Furthermore, in the step flow map, there exist the operation steps where the parallel operations are performed, e.g. "FL REFERENCE PIN A ACTUATED" and "FL REFERENCE PIN B ACTUATED". The analysis on the parallelism in the operation block map is same as the one on the parallelism in the operation step map, which can be recognized from the fields "FROM" and "TO" in the step flow map. Each of the inter lock conditions for a plurality of operation steps (e.g. "FL REFERENCE PIN A ACTUATED" and "FL REFERENCE PIN B ACTUATED") which are in the parallel relation shares the completion condition in the superordinate operation step ("RR SLIDE ACTUATED" step). Furthermore, similar to the generation of a ladder program for an operation block, the starting condition for the subordinate operation steps which are in the parallel relation (e.g. "RR REFERENCE PIN ACTUATED" in FIG. 5) is the product of the completion conditions of the operation steps which are in the parallel relation.

Figure 19:
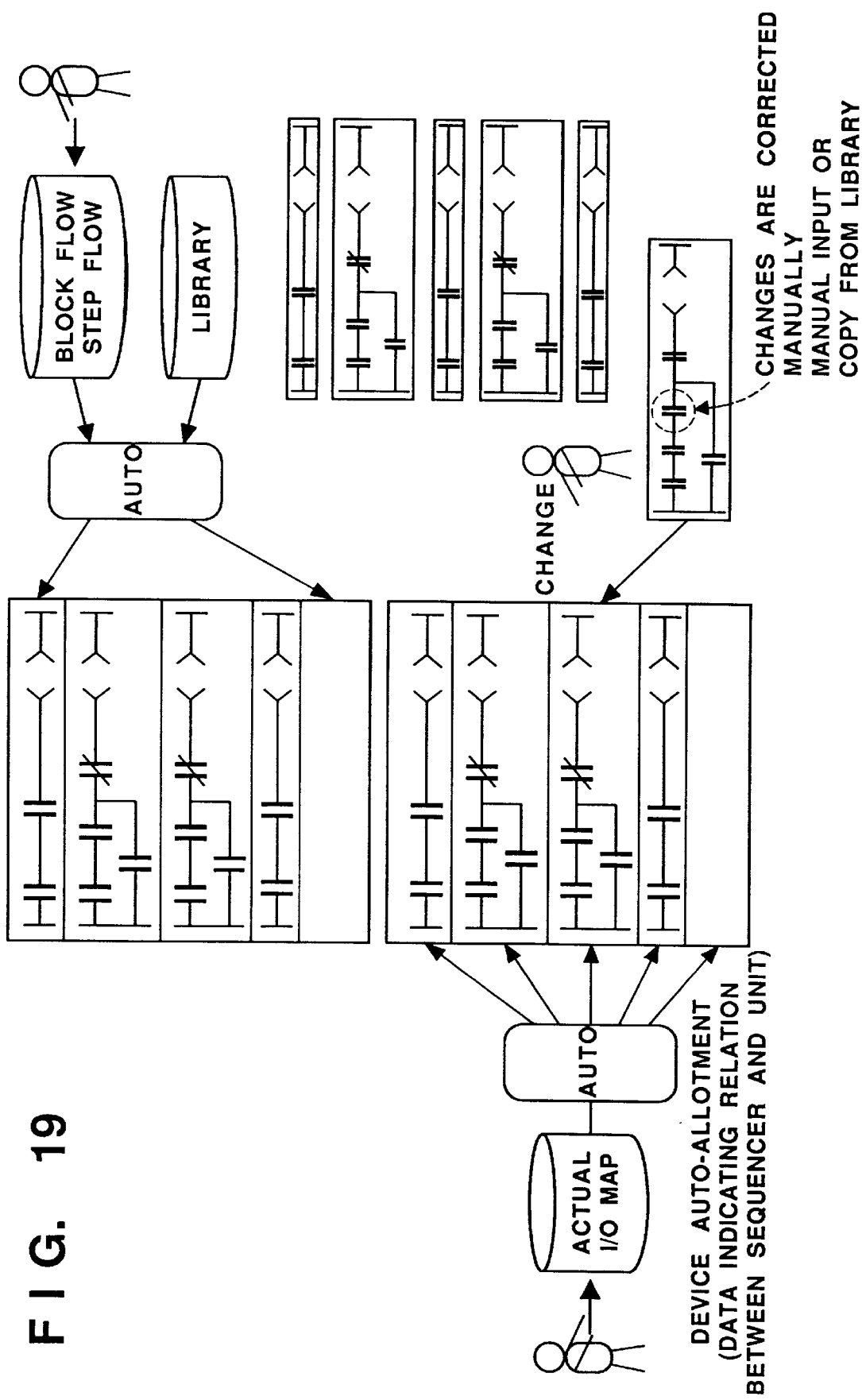
FIG. 19 is a diagram which shows the outline of the system according to the present embodiment.

FIG. 19 is a diagram which symbolized the processes described in Figs from 16 to 18. According to FIG. 18, a partial change in the system can be easily performed. That is, if the change is for a device, the part concerting the change is corrected in the I/O map. In this case, unless the memory address is changed, the reproduction of the ladder program is not necessary. Furthermore, if the change relates to sequence, the operation block flowchart (in FIG. 4) or the operation step flowchart (in FIG. 5) concerning the change is corrected. Then, the programs in FIGS. 17 and 18 are run again and the ladder program is thus generated. In this point, the characteristic of the present system is that only the parts concerning changes need to be corrected for a sequential procedure change or a device change since the information concerning all devices is centralized in the I/O map (FIG. 13) which is searched by the name of the device. Thus, changes and correction of the system are extremely simple.

The production line in FIG. 1 includes the units, i.e. the transfer device, the linear carrying device, and the screwing robot. In these units, the operation is a repeating operation. While the consecutive carrying device, i.e. a belt conveyor, can be installed in the production line. The operation of the consecutive carrying device is a consecutive operation which is different from repeating operation. The ladder patterns which respectively express the repeating operation and the consecutive operation are also different. Therefore, the data file according to the present system (FIG. 14) stores the ladder patterns separately which are prepared in advance in the library by regarding each ladder pattern is unique by the devices, i.e. the transfer device, the linear carrying device, and the screwing robot. Furthermore, it is avoided that the operations of the transfer device, the linear carrying device, and the screwing robot are not coexisted in the same block because of the differences in the characteristics of the devices. The data ("OPERATION TYPE") which indicates the type of the device is further set in the block map of each operation block (FIG. 11). In the case where the ladder program is generated, the "OPERATION TYPE" is referred and the corresponding ladder pattern is retrieved from the library. In the way, the generation of the ladder elements are fasten. An example of the ladder pattern of the consecutive carrying device is shown in FIG. 6.

<USER INTERFACE>

Figure 20:
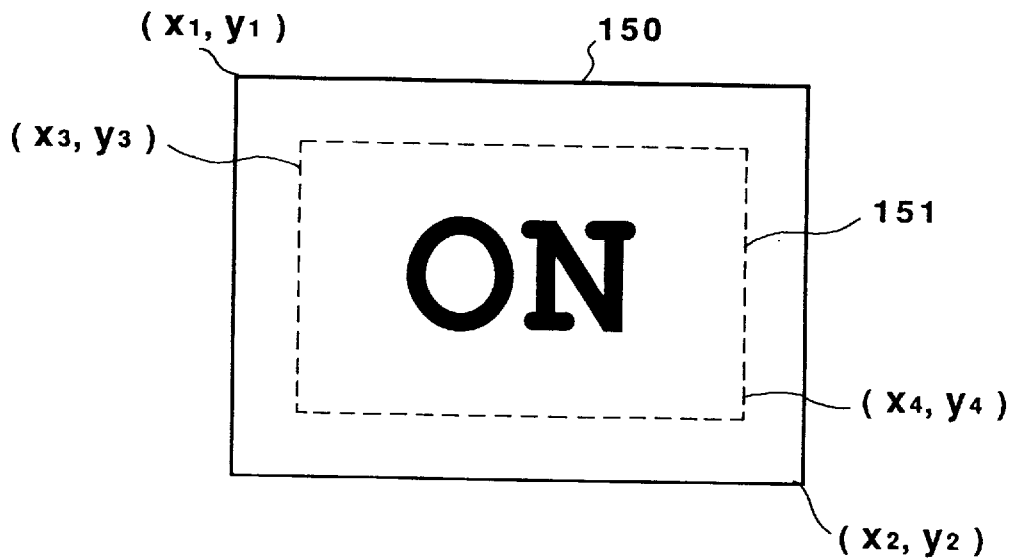
FIG. 20 is a diagram which shows the relation between the touch panel and the display.

The interface in the CRT display device 58 according to the present system has two roles. The first role is as an interface via the multi-window during registration of a ladder pattern, generation of an operation block flowchart or an operation step flowchart. The second role is an interface via the touch panel 57 in order for an operator to give an operational command (referred to as the interface by "button icon"). In this case, the operator recognizes a message from the content which is displayed on the CRT 58 and gives the command to the system in a manner such that a predetermined position is pushed based on the message. The user interface via the touch panel is programmed to perform the predetermined "ON" operation in a manner such that the "ON" is displayed on the display area which is defined by $(x_1, y_1)$ and $(x_2, Y_2)$ of the rectangle 150 as shown in FIG. 20 and that the operator touched a point of the touch detection area which is defined by $(x_3, y_3)$ and $(x_4$ and $y_4)$ of the rectangle 151 is detected. The user interface which uses the touch panel 57 according to the present system basically adopted the above-described procedure. The characteristic is that the display data and function of the button icon which are displayed on the CRT 58 is given from the I/O map. That is, the simulation program and the CRT display program can be programmatically interfaced with another subsystem (the auto-programing subsystem 55) via the I/O map and the step flow map.

Figure 21:
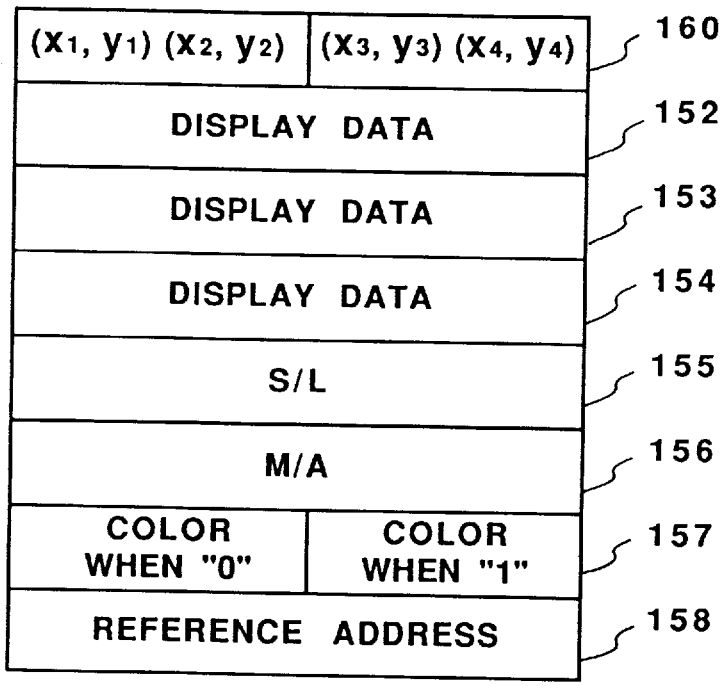
FIG. 21 is a diagram of the structure of the data which controls a display screen.

A button icon according to the present system is defined by the data construction in FIG. 21. The points $(x_1, y_1)$ and $(x_2, Y_2)$ define the rectangle 150 which is a display and the points $(x_3, y_3)$ and $(x_4$ and $y_4)$ define the rectangle 151 which is a touch detection area as shown in FIG. 20. As shown in FIG. 22, the button icon has a three-part data display field. The reference numerals 152, 153, and 154 in FIG. 21 represent texts which are displayed in the three fields. The "S/L" in the reference numeral 155 is the data which distinguishes whether the button icon performs a simple display (L) or includes a switch function (S). The reference numeral 156 which is the "M/A" functions as a momentary switch if "M" is included, while as an alternate switch if "A" is included, in the case where a switch function is given to the button. The reference numeral 157 is a field which defines the display color of the button in the case where the output of the result of the function is given to the button is either "0" or "1".

FIG. 23 is a diagram which shows the arrangement of a plurality of the button icons set on the screen of the CRT device 58. The respective data in FIG. 21 is attached to each button icon. The user determines which device is displayed at which button icon position by each button. In addition, color defined by the fields 157 and switch mode (L/S and M/A) are determined as shown in FIG. 25 by the user. The data which is displayed on the CRT device in the conventional system is originally set by the user and it is a troublesome operation. However, in the present system, the user needs to simply designate the display position of the button, the name of the device, and the color.

FIG. 24 shows an example of the data structure of the name field of a device in the I/O map. The 1 byte ("TL" in FIG. 24) is copied on the field of 152 in FIG. 21 and the m bite ("POSITIONING" in FIG. 24) is copied on the field of 153. As a result, the top part of the button icon in FIG. 22 displays the "TL" and the middle part displays the "POSITIONING". That is, the device name is for a positioning type. If the value of the "CONFIRMATION A" field of the device is "1", "ACTUATED" is displayed on the third field of FIG. 2, while the value is "0", "RETURNED" is displayed.

The designation of the button icon in FIG. 25 is performed in a manner such that the operator starts the data generation program 55. The data generation program 55 generates the button-defined data on each button as FIG. 21 by referring the I/O map, if the operator formed the data as FIG. 25. The generation of the button-defined data fields from 150 to 154 is described above. In the case where the device such as the "TL POSITIONING" is selected as FIG. 24, the state either "ACTUATED" or "RETURNED" should be displayed on the icon. Whether or not the state is "ACTUATED" is diagnosed by referring the data of the memory address which is indicated on the "CONFIRMATION A" of the I/O map of the device. The field 158 in FIG. 21 stores reference addresses for the reference.

In this way, as the screen control data concerning all the button icons in each a screen is generated, the CRT panel control unit 53 displays on the CRT display device by referring the screen control data. If "COLOR DESIGNATION WHEN "0" is red and "COLOR DESIGNATION WHEN "1" is blue, in the case where the "TL POSITIONING" device is the state of the "ACTUATED", the display is in blue.

<FAULT SIMULATION>

In the case where the production line is controlled by the sequential ladder program, unexpected operation errors often take place. The operation errors may be caused by the two cases: 1) Troubles in a unit and 2) variations of the operation state of the units or the operation period. For example, if an actuator becomes sticky because of secular variation, the operation period for the actuator becomes longer. Ordinarily, solid fault is detected by a supervising period set in the system, however, the change of the operation period may be detected as an operation error. Furthermore, in the case where a unit which is relatively heavy is driven, the output state of the confirmation switch (normally, "ACTUATED" and "RETURNED") can be an unexpectable output which is caused by bounces of the actuator.

If faults are expressed in model, there are three cases.

Figure 27:
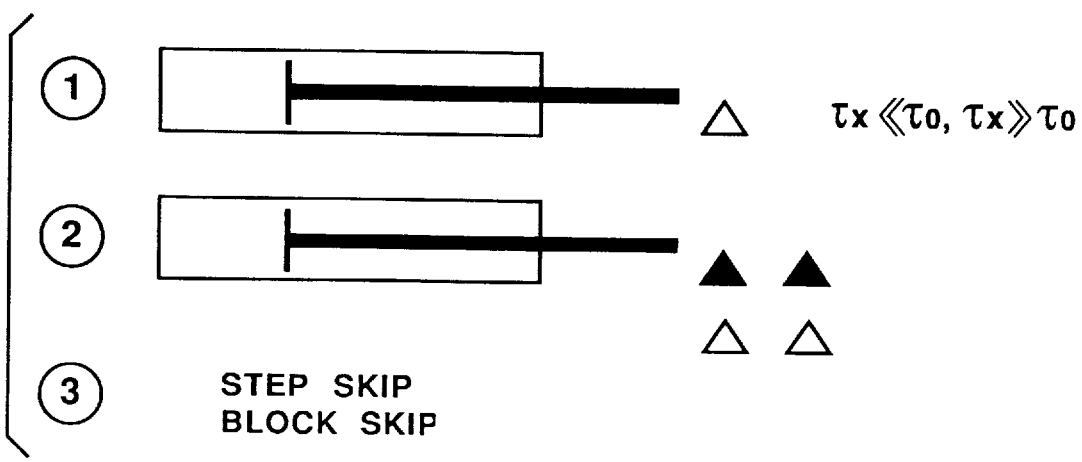
FIG. 27 is a diagram that the occurrence of the fault is represented in a model.

①: The case where an actual operation period $\tau_x$ is either longer or shorter than a nominal operation period $\tau_0$ as shown in ① in FIG. 27.

②: The case where both of the outputs of the confirmation switch are either "ON" or "OFF" as shown in ② in FIG. 27.

③: The case where an operation step or a block is skipped, so-called "STEP SKIP" or "BLOCK SKIP", by the causes ① and ①.

The simulation control unit 54 in FIG. 14 is to simulate the operation error in advance. The characteristic of the unit 54 is that setting a simulation condition is extremely simple by utilizing the I/O map, the block flow map, and the step flow map.

In the I/O map according to the present system, the nominal period $\tau_0$ can be predetermined as shown in Fig. 13. In the process that the step flow map in FIG. 12 is generated from the I/O map, the nominal period $\tau_0$ is copied as $\tau_{si}$ in the step flow map. Furthermore, in the process that the block map is generated (FIG. 11), a period $\tau_{B1}$ for executing the operation block is written in the block flow map. The $\tau_{B1}$ is obtained in a manner such that a tolerance is added to the sum of $\tau_{si}$ in all the operation steps in the block.

Figure 28:
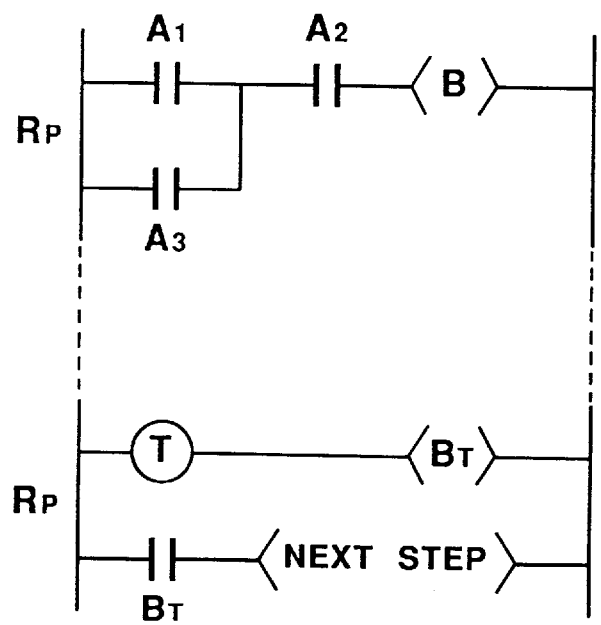
FIG. 28 is a diagram representing one of the examples of the simulation programs which simulates the ladder program.
Figure 29:
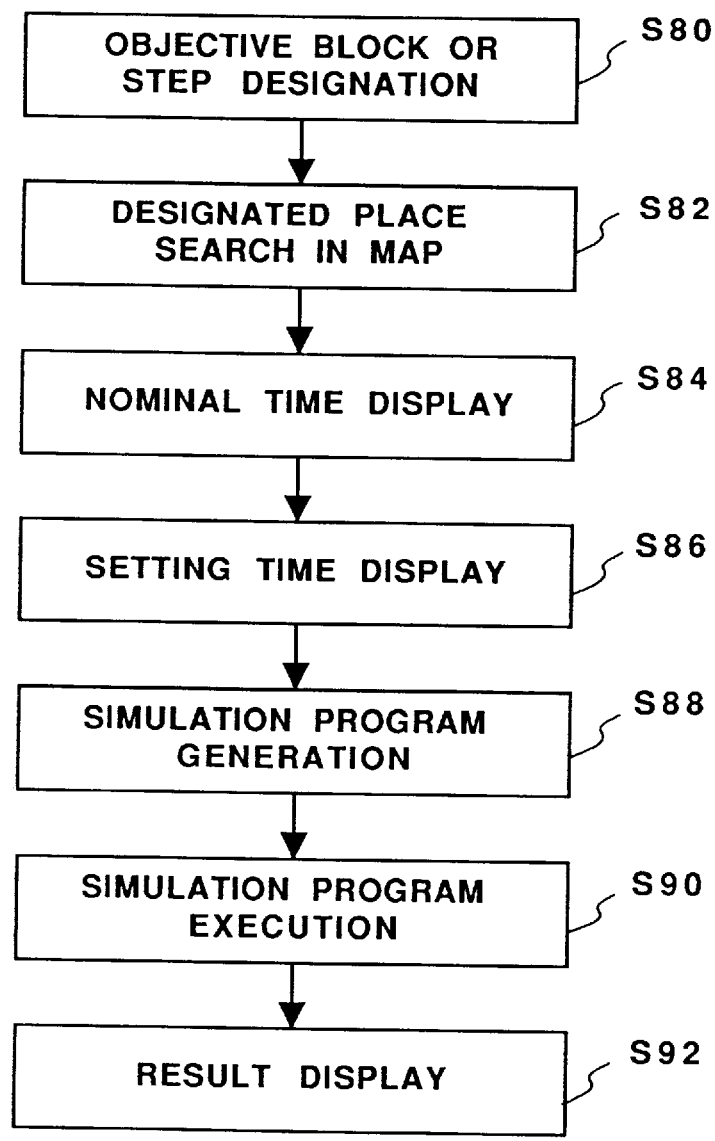

The method for a fault simulation according to the present system is now to be described accompanying with FIGS. 28, 29, and 30.

First, the fault state of ① is enabled to simulate in a manner such that the time for completing an operation step or block is intentionally changed. FIG. 28 shows the ladder program element RP in the operation step and the corresponding simulation program element SP. As shown in FIG. 28, the simulation element SP is expressed by a timer element T of the time which is required for executing the RP. When the timer element becomes time out, the output BT and the "NEXT STEP" signal are consecutively outputted. Therefore, one of the functions of the simulation control unit 54 is how simply the timer element is specified. FIG. 29 is a flowchart expressing the control process which specifies the timer element in the unit 54. In step S80 in FIG. 29, an operation block or step which is an object to the simulation is specified on the CRT device 58. The CRT device 58 displays the ladder program or the block flow map (FIG. 11) and the step flow map (FIG. 12). In step S80, the position where the operator touched on the touch panel 57 is recognized as the operation step or the block which is an object for simulation. In step S82, the object for simulation is searched in the block flow map (FIG. 11) and the step flow map (FIG. 12) based on the system coordinates which are detected by the touch panel 57. The operator takes look at the displayed time and designates how much time is changed. In step S86, the changed time period is inputted. In step S88, the simulation program is generated based on the changed time period and the process proceeds to step S90 where the program is executed.

Thus, if a time period to change is variously changed, a marginal actuator device can be found.

Furthermore, the time period which is necessary for completing the operation is changed in manually in the above-described embodiment, however, it can be changed automatically by the system in a predetermined range based on a nominal time period (i.e. the range of ±10 %) Such an automatic setting shortens the operation period for simulation.

Second, the fault of ① can be simulated by intentionally correcting the confirmation switch of the ladder program of the objective operation step. For example, the fault ① is revealed in a manner such that conformation switches are intentionally set to "1" or "0".

Finally, the simulation of the fault of ① is described. Since the fault is caused by that an operation step is skipped, the states of "STEP SKIP" and "BLOCK SKIP" can be reproduced in a manner such that the ladder element which can be a condition for starting the step (the "B4 STEP 3 OUTPUT" at the address 5042 in FIG. 6A) is changed to stay "ON".

The control process in FIG. 30 realizes how easily the operator designates a place to be corrected in order to correct the ladder program in which the "STEP SKIP" and "BLOCK SKIP" are intentionally caused.

As described above, according the present invention, only one data base including enormous amount of data needs to be developed since the data base is shared among the subsystems. This data base can be accessed in a manner such that the name for each device is predetermined as a key. Therefore, the system is friendly to system developers and system users and as a high efficiency both in system development and system maintenance.

The present invention is not limited to the above embodiments and various changes and modifications can be made within the spirit and scope of the present invention. Therefore, to apprise the public of the scope of the present invention, the following claims are made.

What is claimed is:

1. A method of designing a system program which controls an operation of a plurality of operating production equipment units installed in a production line, comprising the steps of:

producing a data base including name data and operation data for each of a plurality of actuator devices included in the production equipment units, each name data enabling a user to identify a corresponding actuator device and each operation data expressing the corresponding actuator device;

dividing the system into a plurality of subsystems, each of which functions to realize a part of the operation of the plurality of production equipment units; and attaining the operation data of an objective actuator device of each subsystem by searching the data base with each name data as a key, wherein the function of each subsystem is realized.

2. A method according to claim 1, wherein each name data is either the name of an actuator device or the name of the operation by the actuator device.

3. A method according to claim 1, wherein, in the case where a modification is made in any one of the subsystems, the name data of an actuator which is associated with the modification is changed to correspond to the new function.

4. A method according to claim 1, wherein, in the case where the overall system management is changed, functions, name data and operation data which are concerned with the change within the data base are changed.

5. A method for generating symbols for a sequential ladder program which controls a production line including a plurality of actuator devices, comprising the steps of:

registering an actuator device map in a library which includes operation data of each actuator device and name data of each actuator device, said name data being either the name of an actuator device or the name of an operation performed by the actuator device, said name data being assigned by a user, and the actuator device map being accessible by the user;

generating a flow map which includes data representing a sequential operation of the actuator devices in the production line in the terms of the assigned name of the actuator devices; and generating a sequence program for the production line by linking sequential operation data included in the flow map and operation data of a corresponding actuator device included in the actuator device map by using the assigned name of the actuator device included in each sequential operation as a key, according to the order of the sequential operation in the flow map.

6. A method according to claim 5, further comprising the steps of:

preparing standard ladder patterns in advance, each of which includes an interlocking condition symbol, representing a logical step in which the actuator device is activated, and an output symbol; and assigning data in the actuator device map corresponding to an actuator device in the flow map to the interlock condition and the output of the actuator device in the flow map.

7. A method for generating sequential programs for production units comprising the steps of:

generating an actuator device map which includes operation data on an operation of a plurality of actuator devices of the production unit as well as name data on names of the respective actuator devices;

generating a flow map including order data on an order of the sequential operations of the actuator devices in terms of the name data of the sequential operation;

generating a sequence control program for the production units by linking each sequential operation included in the flow map and the operation of an actuator device included in the actuator device map by using the name of an actuator device included in each sequential operation as a key, according to the order of the sequential operation in the flow map.

8. A method according to claim 7, further comprising the steps of:

preparing standard ladder patterns in advance, each of which includes an interlock condition symbol, representing a logic step in which the actuator device is activated, and an output symbol; and assigning respective data in the actuator device map corresponding to an actuator device in the flow map to the interlock condition and the output of the actuator device in the flow map.

9. A method according to Claim 8, wherein the standard ladder patterns are registered as library based on a type of an operation of the production units.

10. A method according to claim 9, wherein the types of the operations of the production units are repeating operation and linear operation.

11. A method according to claim 8, wherein each ladder pattern has a unique pattern.

12. A method according to claim 5, wherein the flow map is produced by a flow chart and is expressed as vector information which is produced by a pattern processor.

13. A method according to claim 5, wherein said flow map comprises a block flow map and a step flow map, said block flow map includes a plurality of operation blocks, and said step flow map includes a sequence of steps defining the operation blocks.

14. A method according to claim 13, wherein each operation block defines a set of unit operations which can be completed independently of any other block.

15. A method according to claim 14, wherein the termination of the operation of one operation block is a condition for starting operation of another operation block.

16. A method according to claim 13, wherein said block flow map includes information indicating a block number corresponding to each operation block to indicate a position in the block flow map, the nearest upstream block number, and the nearest downstream block number.

17. A method according to claim 16, wherein the block flow map includes information indicating an equipment name corresponding to each operation block, an operation time of each operation block, and a step flow pointer to indicate an exact memory address of the step flow map corresponding to each operation block.

18. A method according to claim 13, wherein said step flow map includes information indicating a step number corresponding to each operation step to indicate the position in the step flow map, the nearest upstream step number, and the nearest downstream step number.

19. A method of generating a sequential control program for controlling production equipment units, including a plurality of actuator devices, comprising the steps of:

generating a library including at least names corresponding to all actuator devices included in the production equipment units;

generating a step flow map including a sequence of unit operations performed by the production equipment units, the sequence of unit operations performing control of the production equipment units, wherein a set of a plurality of the unit operations comprises an operation block;

generating a block flow map including a plurality of operation blocks, each operation block defining a plurality of sequential unit operations which can be completed independently of any other operation block;

generating a master table including the names of all actuator devices and a relation between an input and output of a device; and generating a sequential control program for the production equipment units based on the block flow map, the step flow map and the master table.

* * * * *

UNITED STATES PATENT AND TRADEMARK OFFICE
CERTIFICATE OF CORRECTION

PATENT NO. : 5,841,657
DATED : November 24, 1998
INVENTOR(S) : Toshihiko HOSHINO, et al.

It is certified that error appears in the above-identified patent and that said Letters Patent is hereby corrected as shown below:

Col. 7,   line 22,   replace "25" with --25L--.
Col. 9,   line 23,   replace "③" with --④--.
Col. 13,  line 60,   replace "he data" with --the data--.
Col. 21,  line 54,   replace "①" with --②--.
          line 59,   replace "①" with --③--.

Signed and Sealed this

Tenth Day of August, 1999

Attest:

Q. TODD DICKINSON

Attesting Officer          Acting Commissioner of Patents and Trademarks